United States Patent
Hsiao et al.

(10) Patent No.: US 12,422,644 B2
(45) Date of Patent: Sep. 23, 2025

(54) OPTICAL SYSTEM

(71) Applicant: TDK TAIWAN CORP., Taoyuan (TW)

(72) Inventors: Yi-Cheng Hsiao, Taoyuan (TW);
Chao-Chang Hu, Taoyuan (TW);
Che-Wei Chang, Taoyuan (TW);
Chen-Hsien Fan, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 577 days.

(21) Appl. No.: 17/739,380

(22) Filed: May 9, 2022

(65) Prior Publication Data
US 2022/0357548 A1 Nov. 10, 2022

Related U.S. Application Data

(60) Provisional application No. 63/186,496, filed on May 10, 2021.

(51) Int. Cl.
| G02B 7/08 | (2021.01) |
| G02B 7/00 | (2021.01) |
| G02B 7/02 | (2021.01) |
| G02B 7/09 | (2021.01) |
| G02B 15/14 | (2006.01) |

(Continued)

(52) U.S. Cl.
CPC ............... *G02B 7/08* (2013.01); *G02B 7/005* (2013.01); *G02B 7/021* (2013.01); *G02B 7/022* (2013.01); *G02B 7/023* (2013.01); *G02B 7/09* (2013.01); *G02B 15/142* (2019.08); *G02B 27/646* (2013.01); *G03B 3/10* (2013.01); *G03B 5/02* (2013.01); *H04N 23/54* (2023.01); *H04N 23/55* (2023.01); *G03B 2205/0061* (2013.01)

(58) Field of Classification Search
CPC . G02B 5/20; G02B 7/04; G02B 7/003; G02B 7/09; G02B 7/023; G02B 7/022; G02B 7/021; G02B 7/02; G02B 7/005; G02B 7/08; G02B 15/142; H04N 23/55; H04N 23/54
See application file for complete search history.

(56) References Cited

U.S. PATENT DOCUMENTS

| 2021/0026103 A1* | 1/2021 | Wu .......................... G02B 7/08 |
| 2021/0132360 A1* | 5/2021 | Ryoo ................. G02B 13/0065 |
| 2021/0149143 A1* | 5/2021 | Hu ....................... G02B 7/1805 |

FOREIGN PATENT DOCUMENTS

| CN | 112596193 A | 4/2021 |
| CN | 213780486 U | 7/2021 |
| JP | 2002162552 A | 6/2002 |

OTHER PUBLICATIONS

Office Action issued on Jul. 17, 2025 for the corresponding China Application No. 202210497376.2 (10 Pages).

* cited by examiner

*Primary Examiner* — Ricky L Mack
*Assistant Examiner* — Journey F Sumlar
(74) *Attorney, Agent, or Firm* — MUNCY, GEISSLER, OLDS & LOWE, P.C.

(57) ABSTRACT

An optical system includes a first movable portion, a fixed portion, a first driving assembly and a first guiding structure. The first movable portion is connected to a first optical element. The movable portion is movable relative to the fixed portion. The first driving assembly drives the first movable portion to move relative to the fixed portion. The first guiding structure guides the first movable portion to move relative to the fixed portion in a first dimension.

17 Claims, 27 Drawing Sheets

(51) Int. Cl.
*G02B 27/64* (2006.01)
*G03B 3/10* (2021.01)
*G03B 5/02* (2021.01)
*H04N 23/54* (2023.01)
*H04N 23/55* (2023.01)

OPTICAL SYSTEM

CROSS REFERENCE TO RELATED APPLICATIONS

This application claims the benefit of U.S. Provisional Application No. 63/186,496, filed May 10, 2021, the entirety of which is incorporated by reference herein.

BACKGROUND OF THE INVENTION

Field of the Invention

The present disclosure relates to an optical system, and more particularly to an optical system with optical elements that can be precisely adjusted.

Description of the Related Art

As technology has developed, it has become more common to include image-capturing and video-recording functions into many types of modern electronic devices, such as notebook computers, smartphones, and digital cameras. These electronic devices are used more and more often. In addition to the models that have been developed to be more convenient, thin, and lightweight, it is also desirable to provide optical qualities that are better and more stable, offering consumers more choice.

Electronic devices that have image-capturing or video-recording functions normally include one or more lenses, thereby performing such functions as auto focus (AF), zooming, and/or optical image stabilization (OIS). However, when optical elements (e.g. lenses) are driven to move a long distance, this often leads to problems with tilting or deflection. As a result, the present disclosure provides an optical system that is different from the prior art, to improve the stability by precisely adjusting the positions of the optical elements.

BRIEF SUMMARY OF THE INVENTION

In one embodiment of the present disclosure, an optical system includes a first movable portion, a fixed portion, a first driving assembly and a first guiding structure. The first movable portion is connected to a first optical element. The movable portion is movable relative to the fixed portion. The first driving assembly drives the first movable portion to move relative to the fixed portion. The first guiding structure guides the first movable portion to move relative to the fixed portion in a first dimension.

In some embodiments, the optical system further includes a second movable portion and a second driving assembly. The second movable portion is connected to a second optical element. The second movable portion is movable relative to the fixed portion and the first movable portion. The second driving assembly drives the second movable portion to move relative to the fixed portion. The first movable portion is movable within a first range of motion relative to the fixed portion. The second movable portion is movable within a second range of motion relative to the fixed portion. The second range of motion is different from the first range of motion. The second movable portion is movable within a third range of motion relative to the first movable portion.

In some embodiments, the optical system further includes a first stopper assembly, a second stopper assembly, a third stopper assembly, and a fourth stopper assembly. The first stopper assembly defines the movement of the first movable portion relative to the fixed portion. The second stopper assembly defines the movement of the first movable portion relative to the fixed portion. The third stopper assembly defines the movement of the second movable portion relative to the first movable portion. The fourth stopper assembly defining the movement of the second movable portion relative to the first movable portion. The first stopper assembly includes a first stopper element and a second stopper element. The first stopper element is fixedly disposed at the fixed portion. The second stopper element corresponds to the first stopper element, and is fixedly disposed at the first movable portion. When the first movable portion is in a first terminal position relative to the fixed portion, the first stopper element is in direct contact with the second stopper element. The second stopper assembly includes a third stopper element and a fourth stopper element. The third stopper element is fixedly disposed at the fixed portion. The fourth stopper element corresponds to the third stopper element, and is fixedly disposed at the second movable portion. When the first movable portion is in a second terminal position relative to the fixed portion, the third stopper element is in direct contact with the fourth stopper element. The first terminal position is different from the second terminal position. The third stopper assembly includes a fifth stopper element and a sixth stopper element. The fifth stopper element is fixedly disposed at the first movable portion. The sixth stopper element corresponds to the fifth stopper element, and is fixedly disposed at the second movable portion. When the second movable portion is in a third terminal position relative to the first movable portion, the fifth stopper element is in direct contact with the sixth stopper element. The fourth stopper assembly includes a seventh stopper element and an eighth stopper element. The seventh stopper element is fixedly disposed at the first movable portion. The eighth stopper element corresponds to the seventh stopper element, and is fixedly disposed at the second movable portion. When the second movable portion is in a fourth terminal position relative to the first movable portion, the seventh stopper element is in direct contact with the eighth stopper element. The third terminal position is different from the fourth terminal position. When the fifth stopper element and the sixth stopper element are in contact, the first movable portion may carry the second movable portion in a first motion in the first dimension. When the seventh stopper element and the eighth stopper element are in contact, the first movable portion may carry the second movable portion in a second motion in the first dimension, wherein the first motion and the second motion are in opposite directions.

In some embodiments, the first stopper assembly further includes a first damping element disposed at the first stopper element or at the second stopper element. The second stopper assembly further includes a second damping element disposed at the third stopper element or at the fourth stopper element. The third stopper assembly further includes a third damping element disposed at the fifth stopper element or at the sixth stopper element. The fourth stopper assembly further includes a fourth damping element disposed at the seventh stopper element or at the eighth stopper element.

In some embodiments, the first guiding structure includes a first guiding element, a second guiding element, a third guiding element, a fourth guiding element, a fifth guiding element, and a sixth guiding element. The first guiding element with a rod structure extends in the first direction, and is fixedly disposed at the fixed portion. The shortest distance between the first guiding element and the first movable portion is shorter than the shortest distance between the first guiding element and the second movable portion. The second guiding element is located at the first movable portion, and has an opening structure that corresponds to the first guiding element. The third guiding element is located at the second movable portion, and has an opening structure that corresponds to the first guiding element. The fourth guiding element with a rod structure is disposed in parallel with the first guiding element, and is fixedly disposed at the fixed portion. The shortest distance between the fourth guiding element and the first movable portion is shorter than the shortest distance between the fourth guiding element and the second movable portion. The fifth guiding element is located at the first movable portion, and has an opening structure corresponding to the fourth guiding element. The sixth guiding element is located at the second movable portion, and has an opening that corresponds to the fourth guiding element. When viewed in a second direction that is perpendicular to the first direction, the second center of the opening structure of the second guiding element and the fifth center of the opening structure of the fifth guiding element form a first line. The first line is neither parallel nor perpendicular to the first direction. When viewed in the second direction, the third center of the opening structure of the third guiding element and the sixth center of the opening structure of the sixth guiding element form a second line. The second line is neither parallel nor perpendicular to the first direction.

In some embodiments, the optical system further includes a second guiding structure guiding the second movable portion to move relative to the first movable portion in a second dimension. A motion in the first dimension is a motion in the first direction, and a motion in the second dimension is a motion in a third direction. The first direction is parallel to the third direction. The second guiding structure includes a seventh guiding element, an eighth guiding element, a ninth guiding element, and a tenth guiding element. The seventh guiding element with a rod structure extends in the third direction, and is fixedly disposed at the first movable portion. The largest size of the seventh guiding element in the third direction is smaller than the largest size of the first guiding element in the first direction. The eighth guiding element is located at the second movable portion, and has an opening structure that corresponds to the seventh guiding element. The ninth guiding element with a rod structure is disposed in parallel with the seventh guiding element, and is fixedly disposed at the first movable portion. The tenth guiding element is located at the second movable portion, and has an opening structure that corresponds to the ninth guiding element. When viewed in the second direction, the eighth center of the opening structure of the eighth guiding element and the tenth center of the opening structure of the tenth guiding element form a third line. The third line is neither parallel nor perpendicular to the first direction.

In some embodiments, when viewed in the second direction, the first guiding element at least partially overlaps the seventh guiding element; the fourth guiding element at least partially overlaps the ninth guiding element. The first center of the first guiding element and the fourth center of the fourth guiding element form a fourth line. The fourth line is perpendicular and also parallel to the first direction. The seventh center of the seventh guiding element and the ninth center of the ninth guiding element form a fifth line. The fifth line is perpendicular to the second direction. The fifth line is neither parallel nor perpendicular to the third direction.

In some embodiments, the first movable portion includes a first connection strengthening portion and a first adhesive element. The first adhesive element is disposed at the first connection strengthening portion. The first optical element includes a first extension, protruding toward the first connection strengthening portion. When viewed in the second direction, the first connection strengthening portion at least partially overlaps the first extension of the first optical element. When viewed in the third direction, the first optical element at least partially overlaps the seventh guiding element.

In some embodiments, the second movable portion includes a second connection strengthening portion and a second adhesive element. The second adhesive element is disposed at the second connection strengthening portion. The second optical element includes a second extension, protruding toward the second connection strengthening portion. When viewed in the second direction, the second connection strengthening portion at least partially overlaps the second extension of the second optical element. When viewed in the third direction, the second optical element at least partially overlaps the ninth guiding element.

In some embodiments, when viewed in the second direction, the center of the first connection strengthening portion and the center of the second connection strengthening portion form a sixth line. The sixth line is neither parallel nor perpendicular to the first direction.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
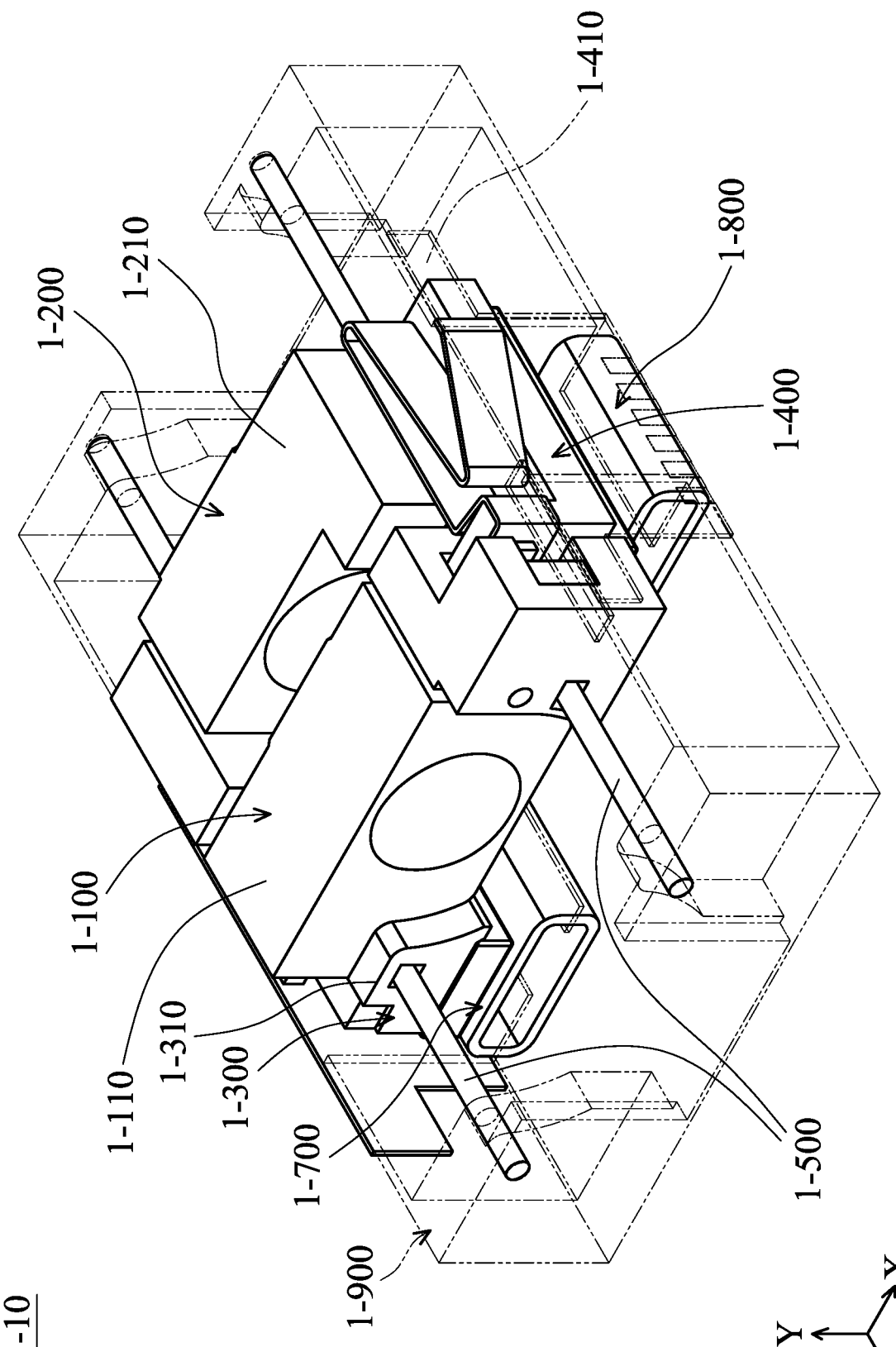
FIG. 1 is a perspective view of the optical system, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

The first embodiment of the present disclosure is described below.

An optical system is provided in the present disclosure, including a plurality of optical elements. These optical elements are movable relative to each other for optical zooming or focusing effects. In some embodiments, during operation, in order to reduce the tilting of optical elements, the first optical element carries the second optical element to move when it does. After the first optical element arrives at the desired position, the second optical element is then finely adjusted, so that the second optical element moves to the desired position. These operations are achieved by a plurality of guiding structures and driving assemblies. As a result, the precision of control may be efficiently improved, providing better optical quality.

Referring to FIG. 1, FIG. 1 is a perspective view of the optical system 1-10, according to some embodiments of the present disclosure. As shown in FIG. 1, the optical system 1-10 mainly includes a first optical element 1-100, a second optical element 1-200, a first movable portion 1-300, a second movable portion 1-400, a first guiding structure 1-500, a second guiding structure 1-600 (see FIG. 6), a first driving assembly 1-700, a second driving assembly 1-800, and a fixed portion 1-900. In some embodiments, the first optical element 1-100 and the second optical element 1-200 may each include one or more lenses, forming individual lens groups. In some specific embodiments, the first optical element 1-100 is for optical zooming, and the second optical element 1-200 is for optical focusing. Of course, the functions of the first optical element 1-100 and the second optical element 1-200 may be adjusted or exchanged based on requirements of users. In the embodiment shown in FIG. 1, the first optical element 1-100 is connected to the first movable portion 1-300. The first movable portion 1-300 and the first optical element 1-100 are driven by the first driving assembly 1-700 to move relative to the fixed portion 1-900. Similarly, the second optical element 1-200 is connected to the second movable portion 1-400. The second movable portion 1-400 and the second optical element 1-200 are driven by the second driving assembly 1-800 to move relative to the fixed portion 1-900. It should be noted that the second movable portion 1-400 is movable relative to the first movable portion 1-300, which will be described in details below.

Figure 2:
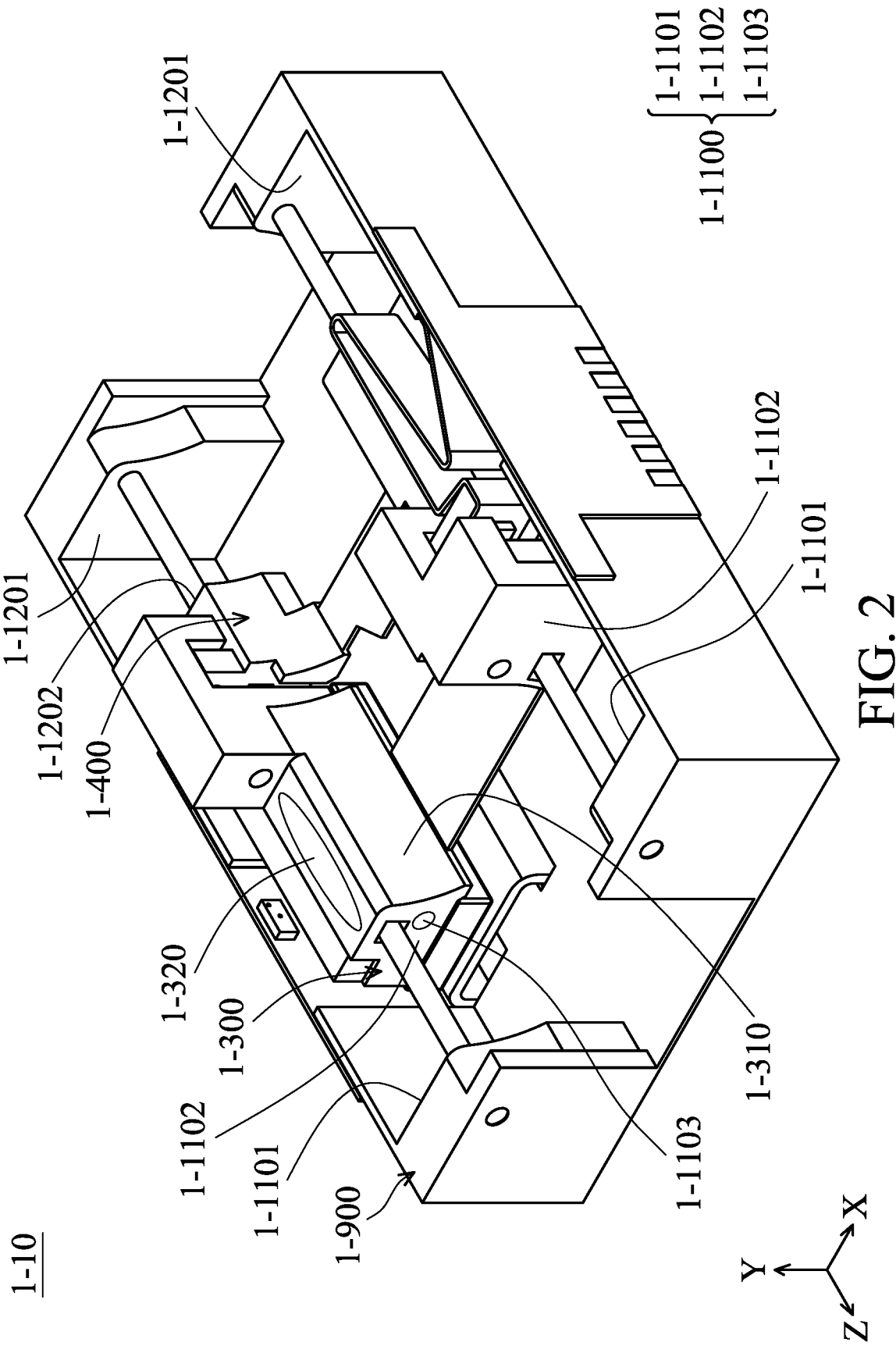
FIG. 2 is a left perspective view of the optical system, according to some embodiments of the present disclosure, wherein the first optical element and the second optical element are omitted.
Figure 3:
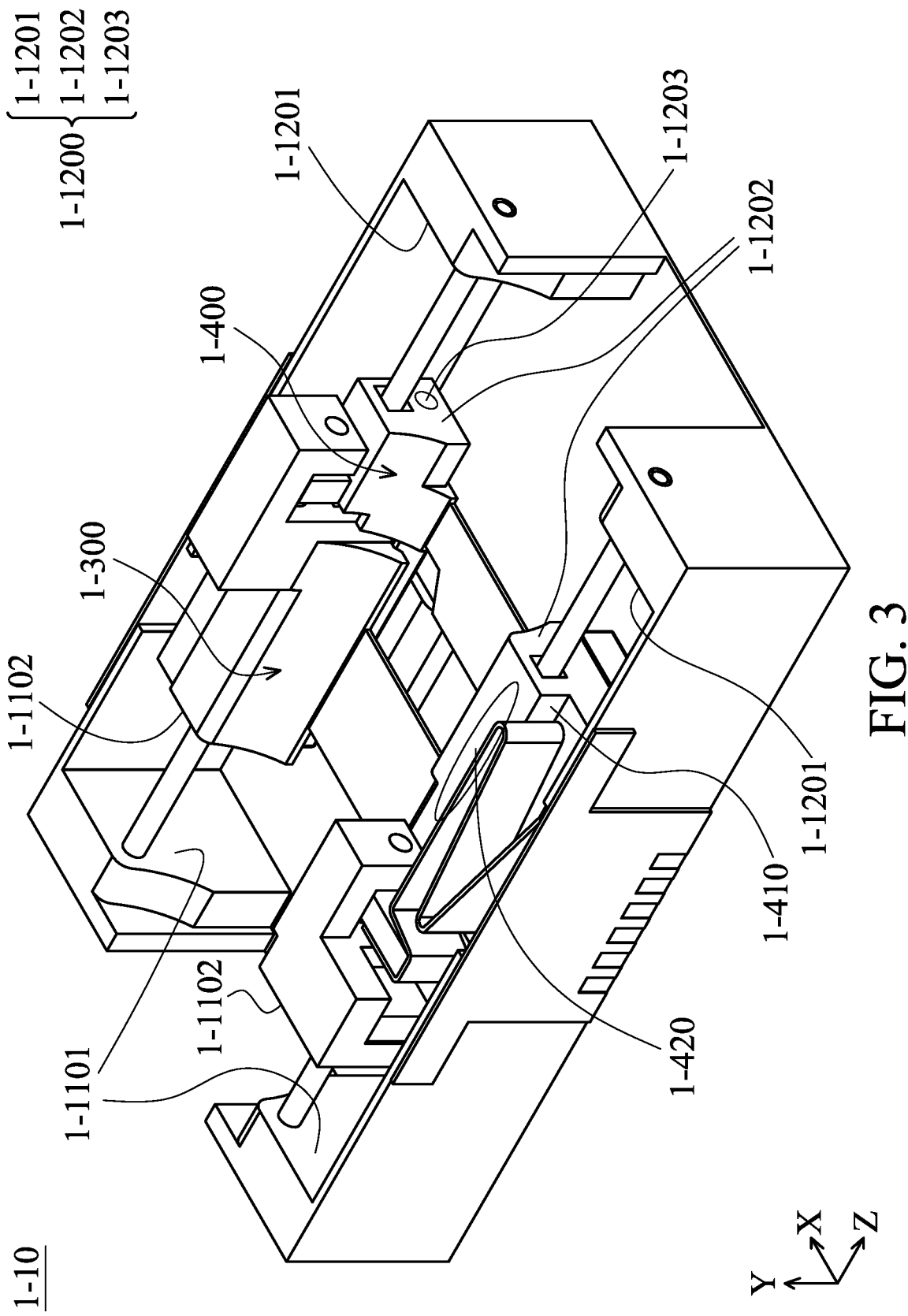
FIG. 3 is a right perspective view of the optical system, according to some embodiments of the present disclosure, wherein the first optical element and the second optical element are omitted.

Next, referring to FIG. 2 and FIG. 3, FIG. 2 and FIG. 3 are a left perspective view and a right perspective view of the optical system 1-10, respectively, according to some embodiments of the present disclosure, wherein the first optical element 1-100 and the second optical element 1-200 are omitted to show the structures of the first movable portion 1-300 and the second movable portion 1-400 clearly.

In some embodiments, the optical system 1-10 further includes a first stopper assembly 1-1100 and a second stopper assembly 1-1200. In some embodiments, the first stopper assembly 1-1100 and the second stopper assembly 1-1200 define the movement of the first movable portion 1-300 relative to the fixed portion 1-900.

In the embodiments shown in FIG. 2 and FIG. 3, the first stopper assembly 1-1100 includes a first stopper element 1-1101, a second stopper element 1-1102, and a first damping element 1-1103. The first stopper element 1-1101 is fixedly disposed at the fixed portion 1-900. For example, the first stopper element 1-1101 may be a surface of the fixed portion 1-900 that faces the first movable portion 1-300. The second stopper element 1-1102 corresponds to the first stopper element 1-1101, and is fixedly disposed at the first movable portion 1-300. For example, the second stopper element 1-1102 may be a surface of the first movable portion 1-300 that faces the fixed portion 1-900. The first damping element 1-1103 may be disposed at the first stopper element 1-1101 or at the second stopper element 1-1102. In the embodiment shown in FIG. 2, the first damping element 1-1103 is disposed at the second stopper element 1-1102. In some embodiments, the optical system 1-10 may include two sets of first stopper assemblies 1-1100 respectively disposed at opposite sides, as shown in FIG. 2. In some embodiments, when the first movable portion 1-300 is in the first terminal position relative to the fixed portion 1-900, the first stopper element 1-1101 is in direct contact with the second stopper element 1-1102. The range of motion of the first movable portion 1-300 is limited by the surface contact between the first stopper element 1-1101 and the second stopper element 1-1102. The first damping element 1-1103 that is disposed between the first stopper element 1-1101 and the second stopper element 1-1102 may include materials such as acrylic foam, gel, flexible plastic, or the like, which absorbs the impact force between the first stopper element 1-1101 and the second stopper element 1-1102 (e.g. when the first movable portion 1-300 moves to the first terminal position, or when the optical system 1-10 endures an external impact). This not only protects the structure itself, but also prevents noises that may cause interference.

Similarly, the second stopper assembly 1-1200 is disposed on the opposite side from the first stopper assembly 1-1100. The second stopper assembly 1-1200 includes a third stopper element 1-1201, a fourth stopper element 1-1202, and a second damping element 1-1203. The third stopper element 1-1201 is fixedly disposed at the fixed portion 1-900. For example, the third stopper element 1-1201 may be a surface of the fixed portion 1-900 that faces the second movable portion 1-400. The fourth stopper element 1-1202 corresponds to the third stopper element 1-1201, and is fixedly disposed at the second movable portion 1-400. For example, the fourth stopper element 1-1202 may be a surface of the second movable portion 1-400 that faces the fixed portion 1-900. The second damping element 1-1203 may be disposed at the third stopper element 1-1201 or at the fourth stopper element 1-1202. In the embodiment shown in FIG. 3, the second damping element 1-1203 is disposed at the fourth stopper element 1-1202. In some embodiments, the optical system 1-10 may include two sets of second stopper assemblies 1-1200 respectively disposed at opposite sides, as shown in FIG. 3. In some embodiments, when the first movable portion 1-300 is in the second terminal position relative to the fixed portion 1-900, the third stopper element 1-1201 is in direct contact with the fourth stopper element 1-1202. The range of motion of the second movable portion 1-400 (and thus the first movable portion 1-300) is limited by the surface contact between the third stopper element 1-1201 and the fourth stopper element 1-1202. The first terminal position and the second terminal position of the first movable portion 1-300 are different. The second damping element 1-1203 that is disposed between the third stopper element 1-1201 and the fourth stopper element 1-1202 may have the same or similar material and function as the first damping element 1-1103 that is described above, thus it is not repeated herein.

Figure 4:
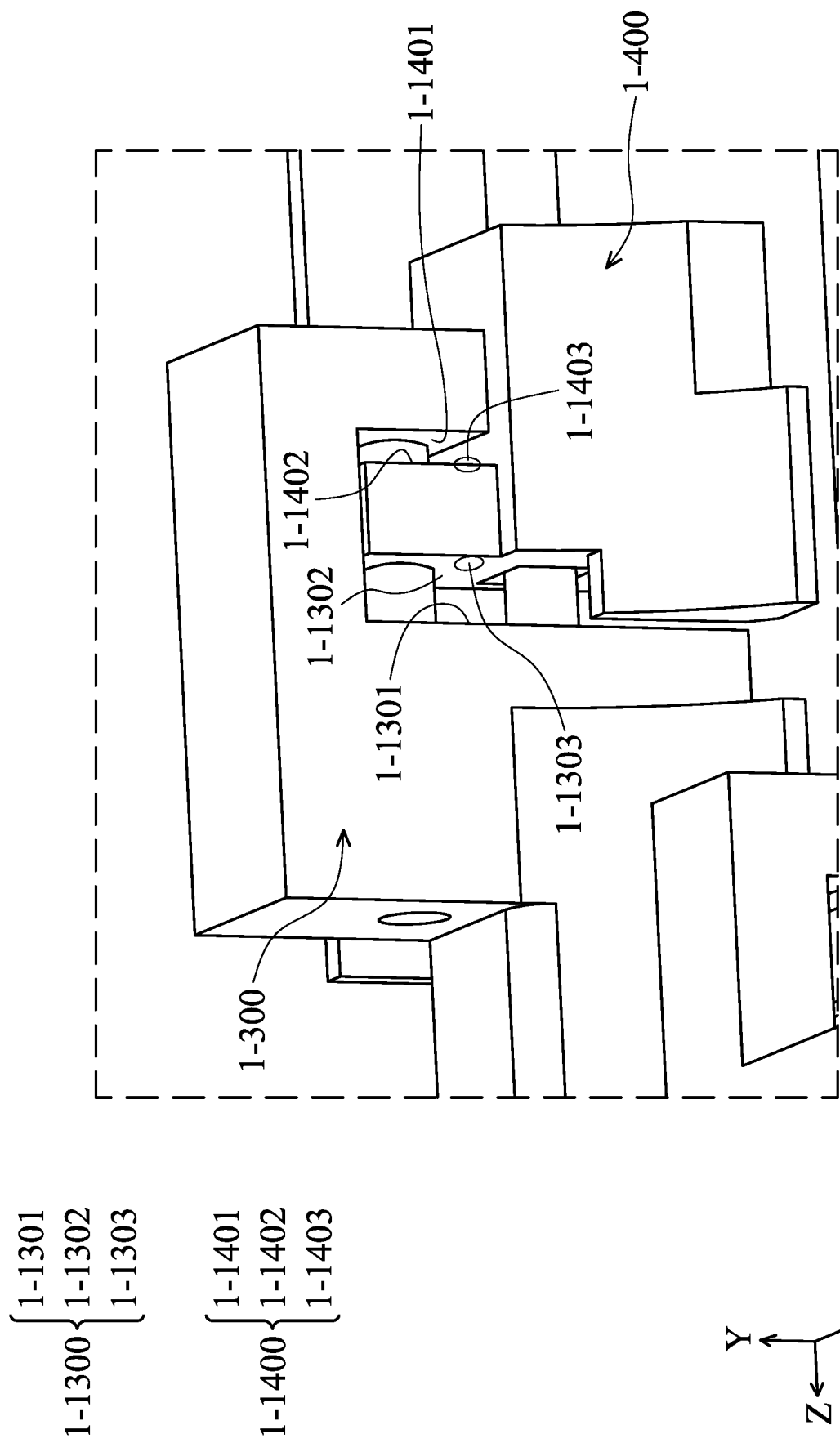
FIG. 4 is a zoomed-in view of the optical system, according to some embodiments of the present disclosure.
Figure 5:
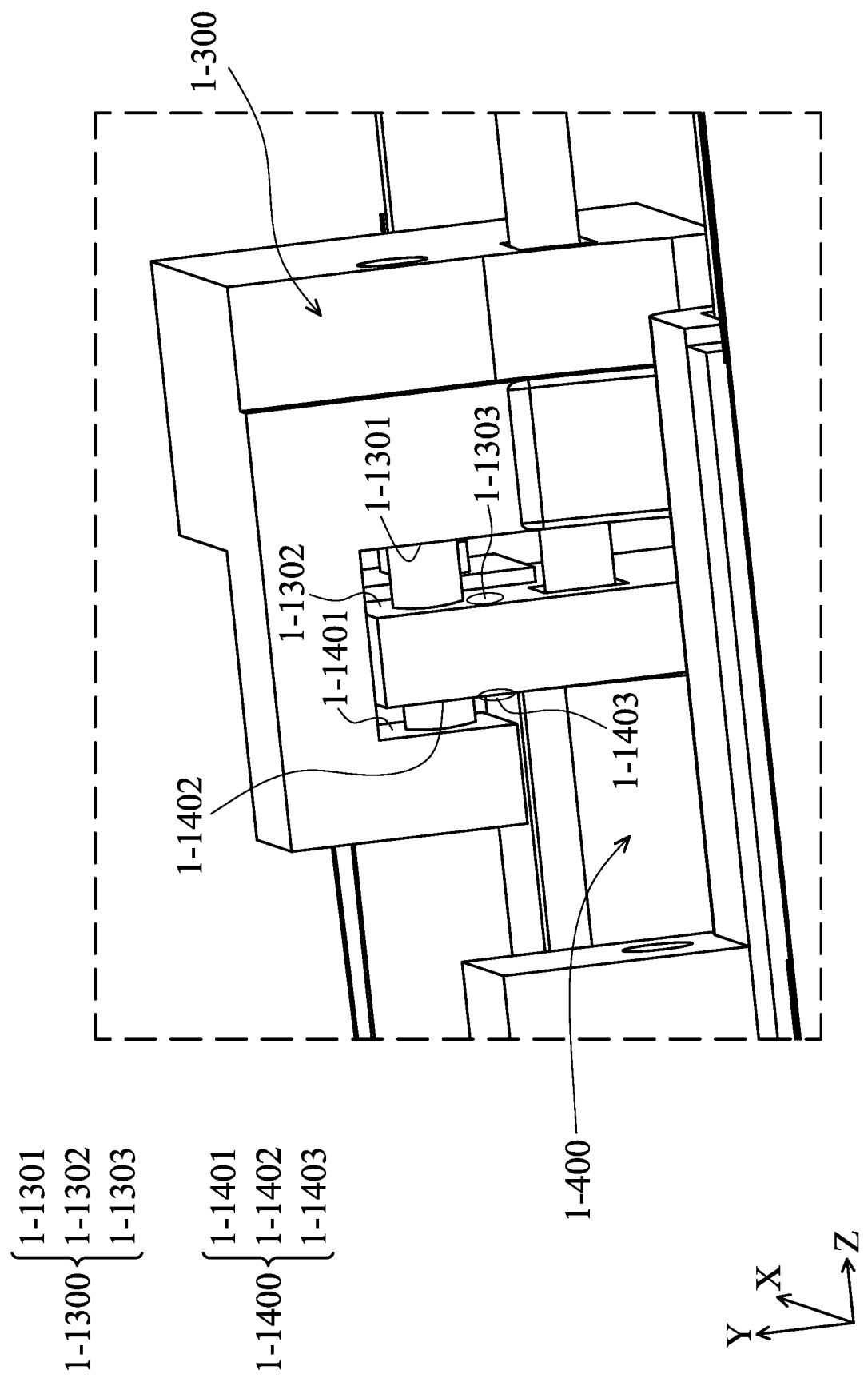
FIG. 5 is a zoomed-in view of the optical system, according to some embodiments of the present disclosure.

Next, referring to FIG. 4 and FIG. 5, FIG. 4 and FIG. 5 are zoomed-in views of the optical system 1-10, showing the structure configurations between the first movable portion 1-300 and the second movable portion 1-400, according to some embodiments of the present disclosure. In some embodiments, the optical system 1-10 further includes a third stopper assembly 1-1300 and a fourth stopper assembly 1-1400. In some embodiments, the third stopper assembly 1-1300 and the fourth stopper assembly 1-1400 define the movement of the second movable portion 1-400 relative to the first movable portion 1-300.

In the embodiments shown in FIG. 4 and FIG. 5, the third stopper assembly 1-1300 includes a fifth stopper element 1-1301, a sixth stopper element 1-1302, and a third damping element 1-1303. The fifth stopper element 1-1301 is fixedly disposed at the first movable portion 1-300. For example, the fifth stopper element 1-1301 may be a surface of the first movable portion 1-300 that faces the second movable portion 1-400. The sixth stopper element 1-1302 corresponds to the fifth stopper element 1-1301, and is fixedly disposed at the second movable portion 1-400. For example, the sixth stopper element 1-1302 may be a surface of the second movable portion 1-400 that faces the first movable portion 1-300. The third damping element 1-1303 may be disposed at the fifth stopper element 1-1301 or at the sixth stopper element 1-1302. In the embodiment shown in FIG. 4, the third damping element 1-1303 is disposed at the sixth stopper element 1-1302. In some embodiments, the optical system 1-10 may include two sets of third stopper assemblies 1-1300 respectively disposed at opposite sides. FIG. 4 and FIG. 5 show one of the third stopper assemblies 1-1300, respectively. In some embodiments, when the second movable portion 1-400 is in the third terminal position relative to the first movable portion 1-300, the fifth stopper element 1-1301 is in direct contact with the sixth stopper element 1-1302. The range of motion of the second movable portion 1-400 relative to the first movable portion 1-300 is limited by the surface contact between the fifth stopper element 1-1301 and the sixth stopper element 1-1302. The third damping element 1-1303 that is disposed between the fifth stopper element 1-1301 and the sixth stopper element 1-1302 may have the same or similar material and function as the first damping element 1-1103 that is described above, thus it is not repeated herein.

Similarly, the fourth stopper assembly 1-1400 is disposed on the opposite side from the third stopper assembly 1-1300. The fourth stopper assembly 1-1400 includes a seventh stopper element 1-1401, an eighth stopper element 1-1402, and a fourth damping element 1-1403. The seventh stopper element 1-1401 is fixedly disposed at the first movable portion 1-300. For example, the seventh stopper element 1-1401 may be another surface of the first movable portion 1-300 that faces the second movable portion 1-400. The eighth stopper element 1-1402 corresponds to the seventh stopper element 1-1401, and is fixedly disposed at the second movable portion 1-400. For example, the eighth stopper element 1-1402 may be another surface of the second movable portion 1-400 that faces the first movable portion 1-300. The fourth damping element 1-1403 may be disposed at the seventh stopper element 1-1401 or at the eighth stopper element 1-1402. In the embodiment shown in FIG. 4, the fourth damping element 1-1403 is disposed at the eighth stopper element 1-1402. In some embodiments, the optical system 1-10 may include two sets of fourth stopper assemblies 1-1400 respectively disposed at opposite sides. FIG. 4 and FIG. 5 show one of the fourth stopper assemblies 1-1400, respectively. In some embodiments, when the second movable portion 1-400 is in the fourth terminal position relative to the first movable portion 1-300, the seventh stopper element 1-1401 is in direct contact with the eighth stopper element 1-1402. The range of motion of the second movable portion 1-400 relative to the first movable portion 1-300 is limited by the surface contact between the seventh stopper element 1-1401 and the eighth stopper element 1-1402. The third terminal position and the fourth terminal position of the second movable portion 1-400 are different. The fourth damping element 1-1403 that is disposed between the seventh stopper element 1-1401 and the eighth stopper element 1-1402 may have the same or similar material and function as the first damping element 1-1103 that is described above, thus it is not repeated herein.

In some embodiments according to the present disclosure, the first movable portion 1-300 is movable within the range of motion defined by the first stopper element 1-1101 and the third stopper element 1-1201. The second movable portion 1-400 is movable within the range of motion defined by the fifth stopper element 1-1301 and the seventh stopper element 1-1401. Specifically, when the fifth stopper element 1-1301 is in contact with the sixth stopper element 1-1302, the second movable portion 1-400 reaches the third terminal position. However, the first movable portion 1-300 may not be in either the first terminal position or the second terminal position at this time. Therefore, the first movable portion 1-300 may carry the second movable portion 1-400 in the first motion relative to the fixed portion 1-900 in the first dimension until the first movable portion 1-300 reaches the second terminal position (when the third stopper element 1-1201 is in contact with the third stopper element 1-1201) and stops. Similarly, when the seventh stopper element 1-1401 is in contact with the eighth stopper element 1-1402, the first movable portion 1-300 may carry the second movable portion 1-400 in the second motion relative to the fixed portion 1-900 in the first dimension until the first movable portion 1-300 reaches the first terminal position (when the first stopper element 1-1101 is in contact with the first stopper element 1-1101) and stops. The directions of the first motion and the second motion are opposite from each other.

In other words, during movements of the first movable portion 1-300, the fifth stopper element 1-1301 may be in contact with the sixth stopper element 1-1302, or the seventh stopper element 1-1401 may be in contact with the eighth stopper element 1-1402. When either contact happens, the first movable portion 1-300 may carry the second movable portion 1-400 to move together relative to the fixed portion 1-900 until the first movable portion 1-300 reaches the desired position and stop together. After the first movable portion 1-300 stops, the second movable portion 1-400 may be separately moved to the desired position to obtain desired optical effects.

In the present disclosure, the range of motion of the first movable portion 1-300 between the first stopper element 1-1101 and the third stopper element 1-1201 is defined as the first range of motion. The first movable portion 1-300 is movable within the first range of motion relative to the fixed portion 1-900. The range of motion of the second movable portion 1-400 along with the first movable portion 1-300 between the first stopper element 1-1101 and the third stopper element 1-1201 is defined as the second range of motion. The second movable portion 1-400 is movable within the second range of motion relative to the fixed portion 1-900. The first range of motion is different from the second range of motion. The range of motion of the second movable portion 1-400 between the fifth stopper element 1-1301 and the seventh stopper element 1-1401 is defined as the third range of motion. The second movable portion 1-400 is movable within the third range of motion relative to the first movable portion 1-300. In some embodiments according to the present disclosure, the movements of the first movable portion 1-300 and the second movable portion 1-400 are in Z direction. In some embodiments, the first range of motion is smaller than the second range of motion, and the third range of motion is smaller than the first range of motion.

Figure 6:
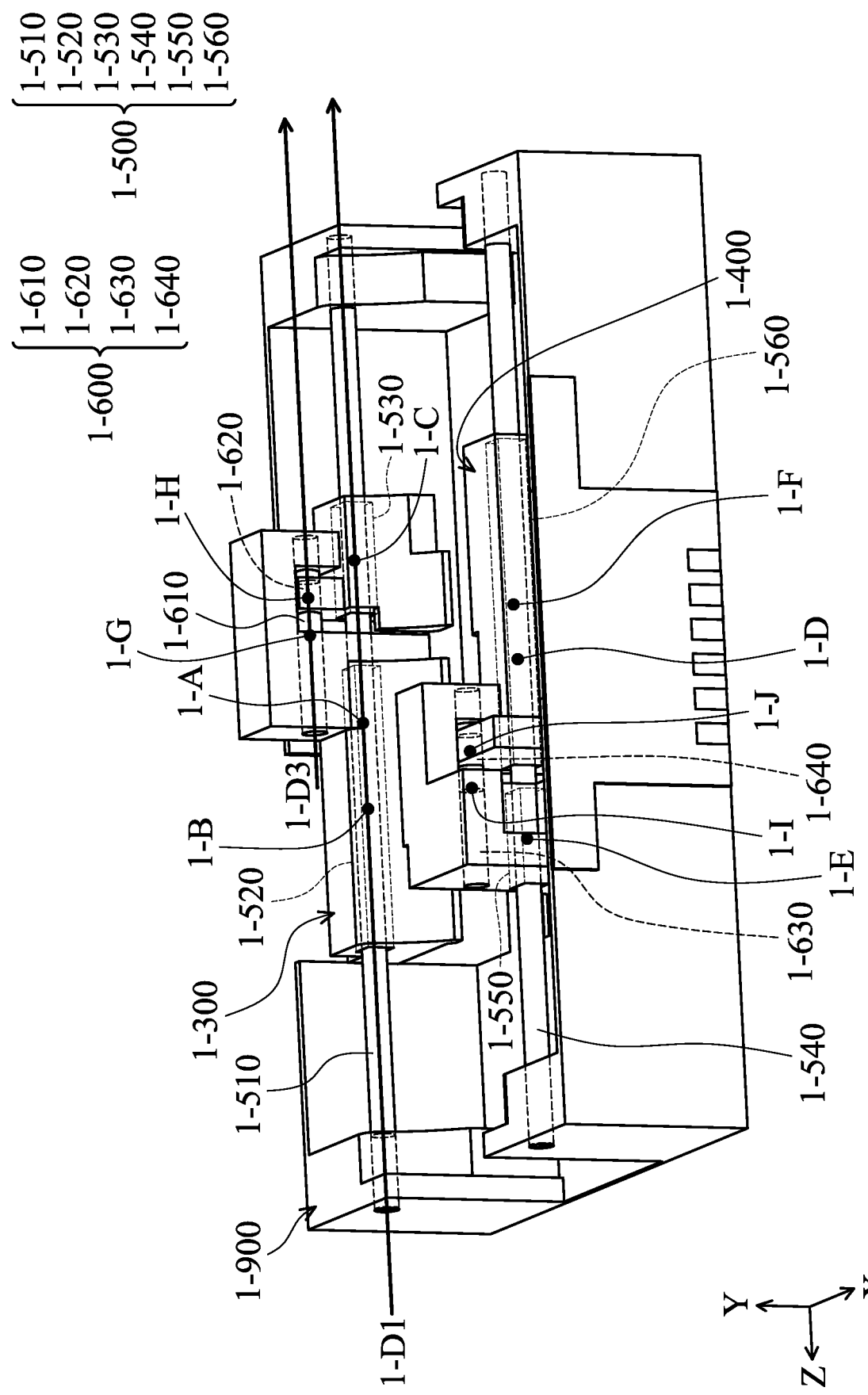
FIG. 6 is a perspective view of the configuration of the first guiding structure and the second guiding structure, according to some embodiments of the present disclosure.
Figure 7:
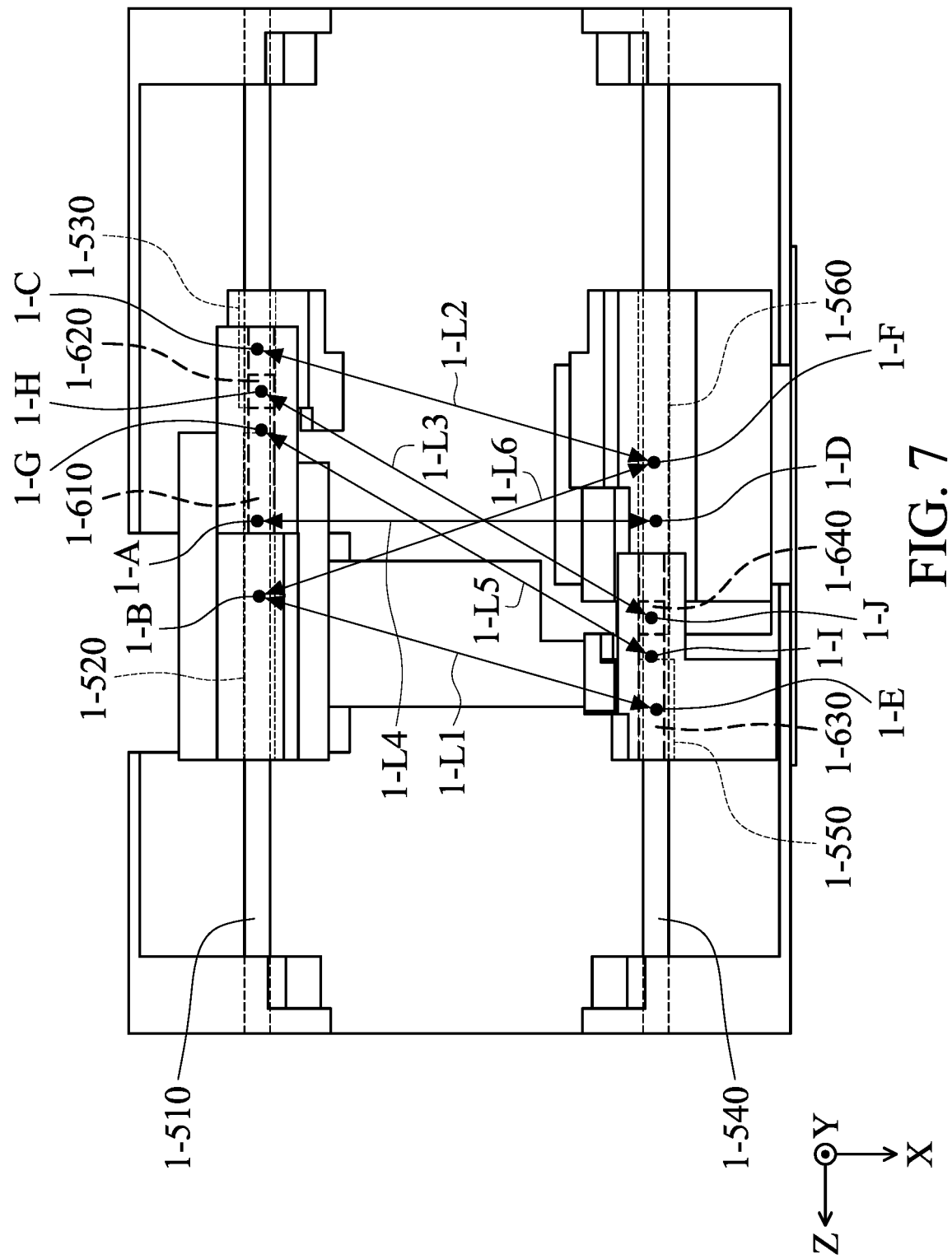
FIG. 7 is a top view of the configuration of the first guiding structure and the second guiding structure, according to some embodiments of the present disclosure.

Next, referring to FIG. 6 and FIG. 7, FIG. 6 and FIG. 7 are a perspective view and a top view of the configuration of the first guiding structure 1-500 and the second guiding structure 1-600, according to some embodiments of the present disclosure. In some embodiments, the first guiding structure 1-500 guides the first movable portion 1-300 to move relative to the fixed portion 1-900 in the first dimension. The second guiding structure 1-600 guides the second movable portion 1-400 to move relative to the first movable portion 1-300 in the second dimension. In the embodiment shown in FIG. 6, a motion in the first dimension is a motion in the first direction 1-D1, and a motion in the second dimension is a motion in the third direction 1-D3. The first direction 1-D1 is parallel to the third direction 1-D3.

In some embodiments, the first guiding structure 1-500 includes a first guiding element 1-510, a second guiding element 1-520, a third guiding element 1-530, a fourth guiding element 1-540, a fifth guiding element 1-550, and a sixth guiding element 1-560. The first guiding element 1-510 has a rod structure that extends in the first direction 1-D1. Each of the two ends of the first guiding element 1-510 is fixedly disposed at the fixed portion 1-900. The second guiding element 1-520 is located at the first movable portion 1-300, and has an opening structure that corresponds to a portion of the first guiding element 1-510. The third guiding element 1-530 is located at the second movable portion 1-400, and also has an opening structure that corresponds to a portion of the first guiding element 1-510. In the embodiment shown in FIG. 6, the first guiding element 1-510 passes through the second guiding element 1-520 in the first movable portion 1-300 and the third guiding element 1-530 in the second movable portion 1-400. The shortest distance between the first guiding element 1-510 and the first movable portion 1-300 is shorter than the shortest distance between the first guiding element 1-510 and the second movable portion 1-400. More specifically, the main purpose of the first guiding element 1-510 is to position the first movable portion 1-300 precisely, therefore, the fitting between the first guiding element 1-510 and the first movable portion 1-300 is closer than the fitting between the first guiding element 1-510 and the second movable portion 1-400. In some embodiments, although the first guiding element 1-510 passes through the third guiding element 1-530 in the second movable portion 1-400, the first guiding element 1-510 is not in direct contact with the second movable portion 1-400.

Similarly, the fourth guiding element 1-540 has a rod structure that extends in the first direction 1-D1. The fourth guiding element 1-540 is disposed in parallel with the first guiding element 1-510. Each of the two ends of the fourth guiding element 1-540 is fixedly disposed at the fixed portion 1-900. The fifth guiding element 1-550 is located at the first movable portion 1-300, and has an opening structure that corresponds to a portion of the fourth guiding element 1-540. The sixth guiding element 1-560 is located at the second movable portion 1-400, and also has an opening structure that corresponds to a portion of the fourth guiding element 1-540. In the embodiment shown in FIG. 6, the fourth guiding element 1-540 passes through the fifth guiding element 1-550 in the first movable portion 1-300 and the sixth guiding element 1-560 in the second movable portion 1-400. The shortest distance between the fourth guiding element 1-540 and the first movable portion 1-300 is shorter than the shortest distance between the fourth guiding element 1-540 and the second movable portion 1-400. More specifically, the main purpose of the fourth guiding element 1-540 is to position the first movable portion 1-300, therefore, the fitting between the fourth guiding element 1-540 and the first movable portion 1-300 is closer than the fitting between the fourth guiding element 1-540 and the second movable portion 1-400. In some embodiments, although the fourth guiding element 1-540 passes through the sixth guiding element 1-560 in the second movable portion 1-400, the fourth guiding element 1-540 is not in direct contact with the second movable portion 1-400. In some specific embodiments, the shortest distance between the first guiding element 1-510 and the first movable portion 1-300 is shorter than the shortest distance between the fourth guiding element 1-540 and the first movable portion 1-300.

In some embodiments, when viewed in the first direction 1-D1 (Z direction), the second guiding element 1-520 through which the first guiding element 1-510 passes may have a V-shaped opening structure, so that the first guiding element 1-510 may be tangent to two slanted sides of the V-shaped structure, and the movement of the first guiding element 1-510 in X direction or Y direction may be restricted. Thus, the first guiding element 1-510 may be secured. As a result, user may dispose the axis of the first guiding element 1-510 at the desired location with ease. On the other hand, the fifth guiding element 1-550 through which the fourth guiding element 1-540 passes may be an opening structure without any special design (e.g. a normal rectangular or circular opening). Since only one of the first guiding element 1-510 and the fourth guiding element 1-540 is precisely positioned, the size errors in the manufacturing process may be tolerated, improving the usability of the optical system 1-10.

In some embodiments, when viewed in the second direction (Y direction) that is perpendicular to the first direction 1-D1, the opening structure of the second guiding element 1-520 has a second center 1-B, which is the center of the second guiding element 1-520, and the opening structure of the fifth guiding element 1-550 has a fifth center 1-E, which is the center of the fifth guiding element 1-550. The second center 1-B and the fifth center 1-E form the first line 1-L1. The first line 1-L1 is neither parallel nor perpendicular to the first direction 1-D1 (Z direction). In some embodiment, when viewed in the second direction, the opening structure of the third guiding element 1-530 has a third center 1-C, which is the center of the third guiding element 1-530, and the opening structure of the sixth guiding element 1-560 has a sixth center 1-F, which is the center of the sixth guiding element 1-560. The third center 1-C and the sixth center 1-F form the second line 1-L2. The second line 1-L2 is neither parallel nor perpendicular to the first direction 1-D1. In some embodiments, the angle formed between the first line 1-L1 and the second line 1-L2 is less than 45 degrees.

In some embodiments, the second guiding structure 1-600 has a seventh guiding element 1-610, an eighth guiding element 1-620, a ninth guiding element 1-630, and a tenth guiding element 1-640. The seventh guiding element 1-610 has a rod structure that extends in the third direction 1-D3. Each of the two ends of the seventh guiding element 1-610 is fixedly disposed at the first movable portion 1-300. The eighth guiding element 1-620 is located at the second movable portion 1-400, and has an opening structure that corresponds to a portion of the seventh guiding element 1-610. In the embodiment shown in FIG. 6, the seventh guiding element 1-610 passes through the eighth guiding element 1-620 in the second movable portion 1-400.

Similarly, the ninth guiding element 1-630 has a rod structure that extends in the third direction 1-D3. The ninth guiding element 1-630 is disposed in parallel with the seventh guiding element 1-610. Each of the two ends of the ninth guiding element 1-630 is fixedly disposed at the first movable portion 1-300. The tenth guiding element 1-640 is located at the second movable portion 1-400, and has an opening structure that corresponds to a portion of the ninth guiding element 1-630. In the embodiment shown in FIG. 6, the ninth guiding element 1-630 passes through the tenth guiding element 1-640 in the second movable portion 1-400. In some specific embodiments, the shortest distance between the seventh guiding element 1-610 and the second movable portion 1-400 is smaller than the shortest distance between the ninth guiding element 1-630 and the second movable portion 1-400.

In some embodiments, when viewed in the first direction 1-D1 (Z direction), the eighth guiding element 1-620 through which the seventh guiding element 1-610 passes may have a V-shaped opening structure that is similar to that of the second guiding element 1-520. The tenth guiding element 1-640 through which the ninth guiding element 1-630 passes may be an opening structure without any special design (e.g. a normal rectangular or circular opening). Since only one of the seventh guiding element 1-610 and the ninth guiding element 1-630 is precisely positioned, the size errors in the manufacturing process may be tolerated, improving the usability of the optical system 1-10.

In some embodiments, when viewed in the second direction, the opening structure of the eighth guiding element 1-620 has an eighth center 1-H, which is the center of the eighth guiding element 1-620, and the opening structure of the tenth guiding element 1-640 has an tenth center 1-J, which is the center of the tenth guiding element 1-640. The eighth center 1-H and the tenth center 1-J form the third line 1-L3. The third line 1-L3 is neither parallel nor perpendicular to the first direction 1-D1.

In some embodiments according to the present disclosure, the largest size of the seventh guiding element 1-610 in the third direction 1-D3 is smaller than the largest size of the first guiding element 1-510 in the first direction 1-D1. That is, the lengths of the seventh guiding element 1-610 and the first guiding element 1-510 are different, and the seventh guiding element 1-610 is shorter than the first guiding element 1-510. Similarly, the largest size of the ninth guiding element 1-630 in the third direction 1-D3 is smaller than the largest size of the fourth guiding element 1-540 in the first direction 1-D1. That is, the lengths of the ninth guiding element 1-630 and the fourth guiding element 1-540 are different, and the ninth guiding element 1-630 is shorter than the fourth guiding element 1-540. In some embodiments, the lengths of the first guiding element 1-510 and the fourth guiding element 1-540 are the same, and the lengths of the seventh guiding element 1-610 and the ninth guiding element 1-630 are the same. However, the lengths of the guiding elements described above are not intended to be limiting. Users may choose suitable lengths for the guiding elements based on their needs.

In addition, in some embodiments, when viewed in the second direction (e.g. the view angle shown in FIG. 7), the first guiding element 1-510 at least partially overlaps the seventh guiding element 1-610, and the fourth guiding element 1-540 at least partially overlaps the ninth guiding element 1-630. In some embodiments, the first guiding element 1-510 has a first center 1-A, which is the center of the first guiding element 1-510, and the fourth guiding element 1-540 has a fourth center 1-D, which is the center of the fourth guiding element 1-540. The first center 1-A and the fourth center 1-D form the fourth line 1-L4. The fourth line 1-L4 is perpendicular to the first direction 1-D1, and is also perpendicular to the second direction (Y direction). In some embodiments, the seventh guiding element 1-610 has a seventh center 1-G, which is the center of the seventh guiding element 1-610, and the ninth guiding element 1-630 has a ninth center 1-I, which is the center of the ninth guiding element 1-630. The seventh center 1-G and the ninth center 1-I form the fifth line 1-L5. The fifth line 1-L5 is perpendicular to the second direction. The fifth line 1-L5 is neither parallel nor perpendicular to the third direction 1-D3.

Referring to FIG. 1 to FIG. 3 again, in some embodiments, the first movable portion 1-300 includes a first connection strengthening portion 1-310 and a first adhesive element 1-320. As shown in FIG. 2, the first adhesive element 1-320 may be disposed at the first connection strengthening portion 1-310. In some embodiments, the first optical element 1-100 includes a first extension 1-110 that protrudes toward the first connection strengthening portion 1-310, as shown in FIG. 1. When viewed in the second direction (Y direction), the first connection strengthening portion 1-310 at least partially overlaps the first extension 1-110 of the first optical element 1-100. The first extension 1-110 is connected to the first connection strengthening portion 1-310 through the first adhesive element 1-320. When viewed in the third direction 1-D3 (or Z direction), the first extension 1-110 of the first optical element 1-100 at least partially overlaps the seventh guiding element 1-610. By disposing the first connection strengthening portion 1-310 and the first extension 1-110, the connection between the first movable portion 1-300 and the first optical element 1-100 may be strengthened, improving the stability of the mechanism.

Similarly, in some embodiments, the second movable portion 1-400 includes a second connection strengthening portion 1-410 and a second adhesive element 1-420. As shown in FIG. 3, the second adhesive element 1-420 may be disposed at the second connection strengthening portion 1-410. In some embodiments, the second optical element 1-200 includes a second extension 1-210 that protrudes toward the second connection strengthening portion 1-410, as shown in FIG. 1. When viewed in the second direction (Y direction), the second connection strengthening portion 1-410 at least partially overlaps the second extension 1-210 of the second optical element 1-200. The second extension 1-210 is connected to the second connection strengthening portion 1-410 through the second adhesive element 1-420. When viewed in the third direction 1-D3, the second extension 1-210 of the second optical element 1-200 at least partially overlaps the ninth guiding element 1-630. By disposing the second connection strengthening portion 1-410 and the second extension 1-210, the connection between the second movable portion 1-400 and the second optical element 1-200 may be strengthened, improving the stability of the mechanism.

In some embodiments, when viewed in the second direction, the first connection strengthening portion 1-310 has a center that substantially overlaps the second center 1-B, and the second connection strengthening portion 1-410 has a center that substantially overlaps the sixth center 1-F. The center of the first connection strengthening portion 1-310 and the center of the second connection strengthening portion 1-410 form the sixth line 1-L6. The sixth line 1-L6 is neither parallel nor perpendicular to the first direction 1-D1. It should be noted that the sixth line 1-L6 intersects the fifth line 1-L5 (which is the line formed by the centers of the seventh guiding element 1-610 and the ninth guiding element 1-630) when viewed in the second direction.

Figure 8:
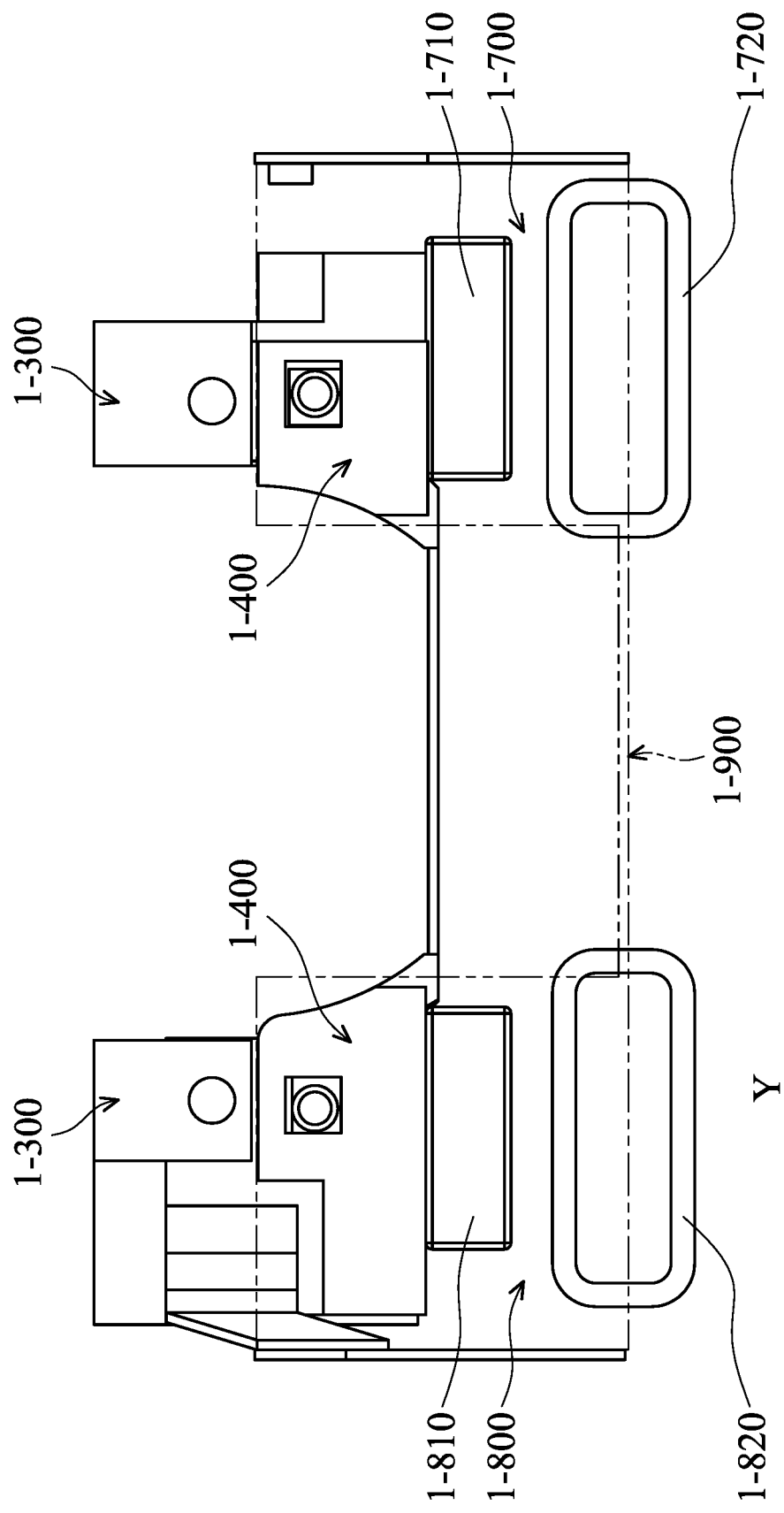
FIG. 8 is a right side view of the optical system, according to some embodiments of the present disclosure.

FIG. 8 is a right side view of the optical system 1-10, according to some embodiments of the present disclosure. As shown in FIG. 8, the first driving assembly 1-700 includes a first magnetic element 1-710 and a first coil 1-720. The first magnetic element 1-710 is connected to the bottom of the first movable portion 1-300, and the first coil 1-720 is fixedly disposed at the fixed portion 1-900. The first movable portion 1-300 is driven to move in the first direction 1-D1 by the electromagnetic driving force generated between the first magnetic element 1-710 and the first coil 1-720. Similarly, the second driving assembly 1-800 includes a second magnetic element 1-810 and a second coil 1-820. The second magnetic element 1-810 is connected to the bottom of the second movable portion 1-400, and the second coil 1-820 is fixedly disposed at the fixed portion 1-900. The second movable portion 1-400 is driven to move in the third direction 1-D3 by the electromagnetic driving force generated between the second magnetic element 1-810 and the second coil 1-820. As mentioned above, during operation, the first driving assembly 1-700 is controlled to drive the first movable portion 1-300 to move to the desired position. After the first movable portion 1-300 reaches its position, the second driving assembly 1-800 is then controlled to finely adjust the position of the second movable portion 1-400. Since the second movable portion 1-400 does not actively move in long distance, the precision of controlling the second driving assembly 1-800 may be efficiently improved.

In summary, the optical system 1-10 of the present disclosure includes a plurality of optical elements (e.g. the first optical element 1-100 and the second optical element 1-200) that are driven by a plurality of driving assemblies (e.g. the first driving assembly 1-700 and the second driving assembly 1-800) to move relative to the fixed portion 1-900 and/or to each other, achieving effects of optical zooming or optical focusing, or the like. A plurality of stopper assemblies (e.g. the first stopper assembly 1-1100, the second stopper assembly 1-1200, the third stopper assembly 1-1300, and the fourth stopper assembly 1-1400) are disposed so that the second movable portion 1-400 may be carried by the first movable portion 1-300 to move together. After the first movable portion 1-300 and the first optical element 1-100 reaches their position, then the second movable portion 1-400 and the second optical element 1-200 are finely adjusted. As a result, the precision of control and the stability of the overall mechanism may be efficiently improved, providing a better optical quality.

The second embodiment of the present disclosure is described below.

An optical system is provided in the present disclosure, including a plurality of optical elements. These optical elements are movable relative to each other for optical zooming or focusing effects. In some embodiments, during operation, in order to reduce the tilting of optical elements, the first optical element carries the second optical element to move when it does. After the first optical element arrives at the desired position, the second optical element is then finely adjusted, so that the second optical element moves to the desired position. In some embodiments, each of the optical elements in the optical system is connected to a movable portion. Each movable portion is driven to move by a driving assembly (e.g. including a magnetic element and a coil). The position of the movable portion is sensed by a sensing assembly (e.g. including a reference magnetic element and a sensor). In the optical system provided in the present disclosure, the configuration of the driving assemblies and the sensing assemblies prevents the magnetic interference among them, thereby achieving good driving effects and sensing effects, which improves the optical quality of the optical system.

Figure 9:
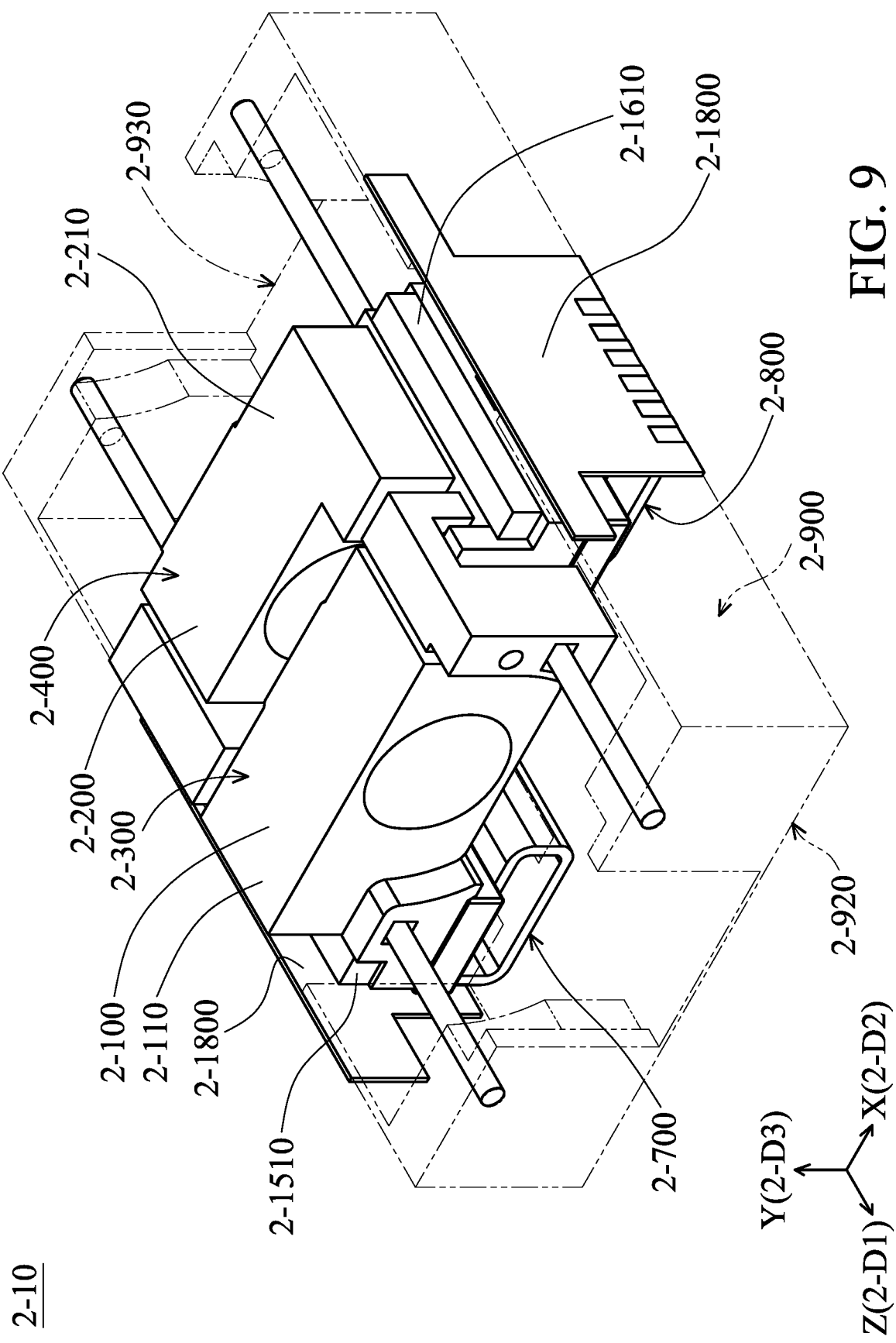
FIG. 9 is a perspective view of the optical system, according to some embodiments of the present disclosure.

Referring to FIG. 9, FIG. 9 is a perspective view of the optical system 2-10, according to some embodiments of the present disclosure. As shown in FIG. 9, the optical system 2-10 mainly includes a first optical element 2-100, a second optical element 2-200, a first movable portion 2-300, a second movable portion 2-400, a first driving assembly 2-700, a second driving assembly 2-800, a fixed portion 2-900, and a circuit assembly 2-1800. In some embodiments, the first optical element 2-100 and the second optical element 2-200 may each include one or more lenses, forming individual lens groups. In some specific embodiments, the first optical element 2-100 is for optical zooming, and the second optical element 2-200 is for optical focusing. Of course, the functions of the first optical element 2-100 and the second optical element 2-200 may be adjusted or exchanged based on requirements of users. In the embodiment shown in FIG. 9, the first optical element 2-100 is connected to the first movable portion 2-300. The first movable portion 2-300 and the first optical element 2-100 are driven by the first driving assembly 2-700 to move relative to the fixed portion 2-900. Similarly, the second optical element 2-200 is connected to the second movable portion 2-400. The second movable portion 2-400 and the second optical element 2-200 are driven by the second driving assembly 2-800 to move relative to the fixed portion 2-900. It should be noted that the second movable portion 2-400 is movable relative to the first movable portion 2-300, which will be described in details below.

Figure 10:
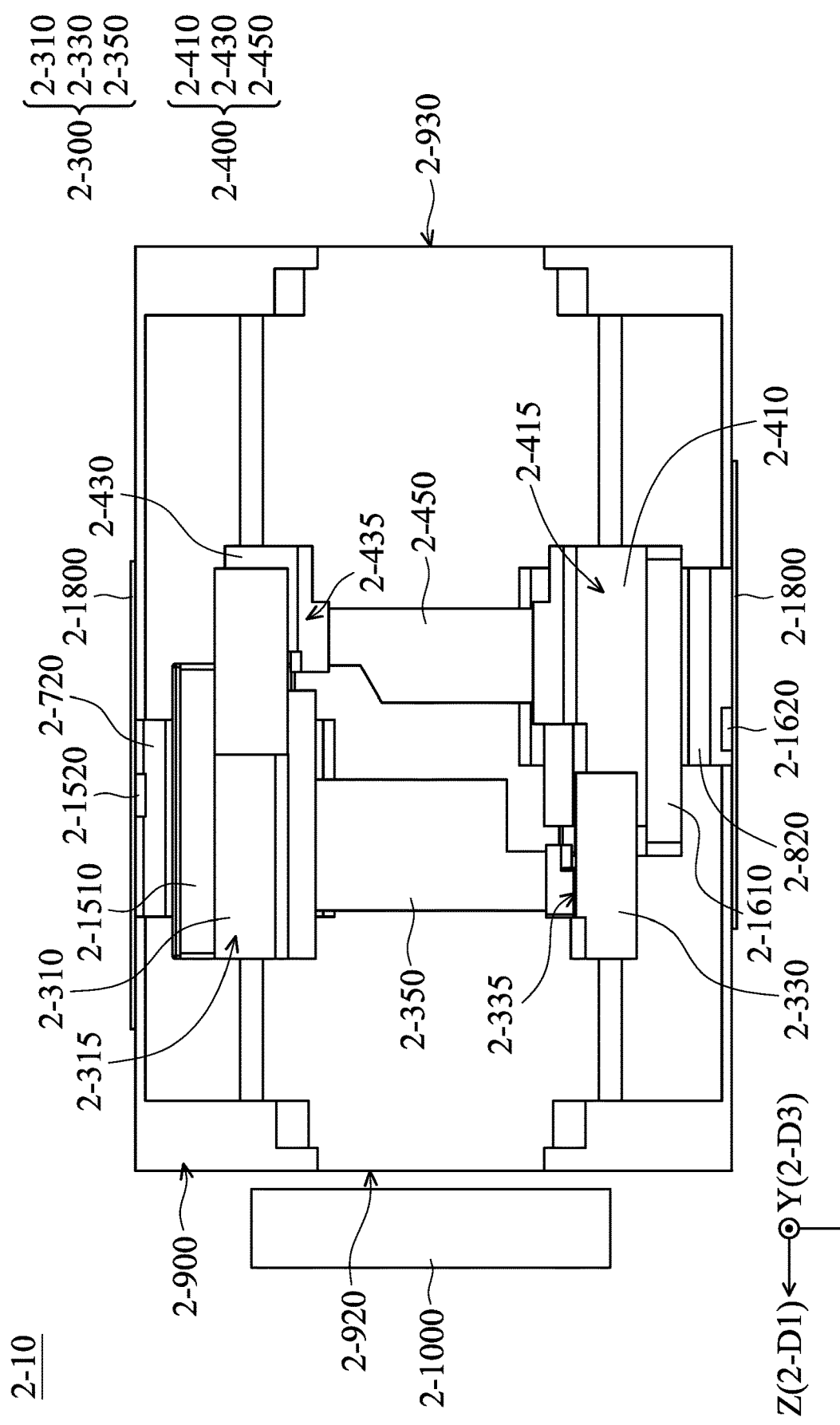
FIG. 10 is a top view of the optical system, according to some embodiments of the present disclosure, wherein the first optical element and the second optical element are omitted.

Next, referring to FIG. 9 and FIG. 10, FIG. 10 is a top view of the optical system 2-10, according to some embodiments of the present disclosure, wherein the first optical element 2-100 and the second optical element 2-200 are omitted. As shown in FIG. 10, the first movable portion 2-300 and the second movable portion 2-400 are arranged in the first direction 2-D1. In the embodiments of the present disclosure, the first direction 2-D1 is parallel to the Z direction in the figures. The first movable portion 2-300 includes a first holder 2-310, a first guiding portion 2-330, and a first connecting portion 2-350. In some embodiments, the first holder 2-310 may have a plastic material, and correspond and connect to the first driving assembly 2-700. The first holder 2-310 is movably connected to the fixed portion 2-900, so that the first movable portion 2-300 is movable relative to the fixed portion 2-900. The first guiding portion 2-330 may have a plastic material, and is movably connected to the second movable portion 2-400. The second movable portion 2-400 is movable relative to the first movable portion 2-300 through the first guiding portion 2-330. The first connecting portion 2-350 may have a magnetic permeable material (e.g. a metal material). The first holder 2-310 is fixedly connected to the first guiding portion 2-330 via the first connecting portion 2-350, forming the first movable portion 2-300 that is movable together relative to the fixed portion 2-900. In some embodiments, a first connection strengthening portion (e.g. the surface facing the first optical element 2-100) of the first holder 2-310 has a first adherent surface 2-315 that corresponds to the first extension 2-110 of the first optical element 2-100 (see FIG. 9). The first extension 2-110 is fixedly connected to the first holder 2-310 via a first adhesive. In some embodiments, the first guiding portion 2-330 has a second adherent surface 2-335 that corresponds to the opposite side of the first optical element 2-100 from the first extension 2-110. The first guiding portion 2-330 is in direct contact with the first optical element 2-100. The first optical element 2-100 is fixedly connected to the first guiding portion 2-330 via a second adhesive. In some embodiments, the largest size of the first holder 2-310 in the first direction 2-D1 is larger than the largest size of the first guiding portion 2-330 in the first direction 2-D1. In some embodiments, the first adhesive and the second adhesive are the same. In some other embodiments, the first adhesive and the second adhesive are different.

Similarly, the second movable portion 2-400 includes a second holder 2-410, a second guiding portion 2-430, and a second connecting portion 2-450. In some embodiments, the second holder 2-410 may have a plastic material, and correspond and connect to the second driving assembly 2-800. The second holder 2-410 is movably connected to the fixed portion 2-900, so that the second movable portion 2-400 is movable relative to the fixed portion 2-900. The second guiding portion 2-430 may have a plastic material, and is movably connected to the first movable portion 2-300. The second movable portion 2-400 is movable relative to the first movable portion 2-300 through the second guiding portion 2-430. The second connecting portion 2-450 may have a magnetic permeable material (e.g. a metal material). The second holder 2-410 is fixedly connected to the second guiding portion 2-430 via the second connecting portion 2-450, forming the second movable portion 2-400 that is movable together relative to the fixed portion 2-900 and the first movable portion 2-300. In some embodiments, a second connection strengthening portion (e.g. the surface facing the second optical element 2-200) of the second holder 2-410 has a third adherent surface 2-415 that corresponds to the second extension 2-210 of the second optical element 2-200 (see FIG. 9). The second extension 2-210 is fixedly connected to the second holder 2-410 via a third adhesive. In some embodiments, the second guiding portion 2-430 has a fourth adherent surface 2-435 that corresponds to the opposite side of the second optical element 2-200 from the second extension 2-210. The second guiding portion 2-430 is in direct contact with the second optical element 2-200. The second optical element 2-200 is fixedly connected to the second guiding portion 2-430 via a fourth adhesive. In some embodiments, the largest size of the second holder 2-410 in the first direction 2-D1 is larger than the largest size of the second guiding portion 2-430 in the first direction 2-D1. In some embodiments, the third adhesive and the fourth adhesive are the same. In some other embodiments, the third adhesive and the fourth adhesive are different.

In addition, according to some embodiments of the present disclosure, the fixed portion 2-900 includes a light entrance 2-920 and a light exit 2-930. Lights enter the optical system 2-10 through the light entrance 2-920, and leave the optical system 2-10 through the light exit 2-930. In some embodiments, the optical system 2-10 further includes a third optical element 2-1000. The third optical element 2-1000 may include one or more lenses, forming an individual lens group. The third optical element 2-1000 may be fixedly disposed at the fixed portion 2-900. In the embodiment shown in FIG. 10, the third optical element 2-1000 is disposed on the side where the light entrance 2-920 of the fixed portion 2-900 is. However, in some other embodiments, the third optical element 2-1000 may also be disposed on the side where the light exit 2-930 is. Alternatively, one third optical element 2-1000 may be disposed respectively on the light entrance 2-920 and on the light exit 2-930. The third optical element 2-1000 may form an optical unit with the first optical element 2-100 and the second optical element 2-200, for determining the optical effects of the optical system 2-10.

Figure 11:
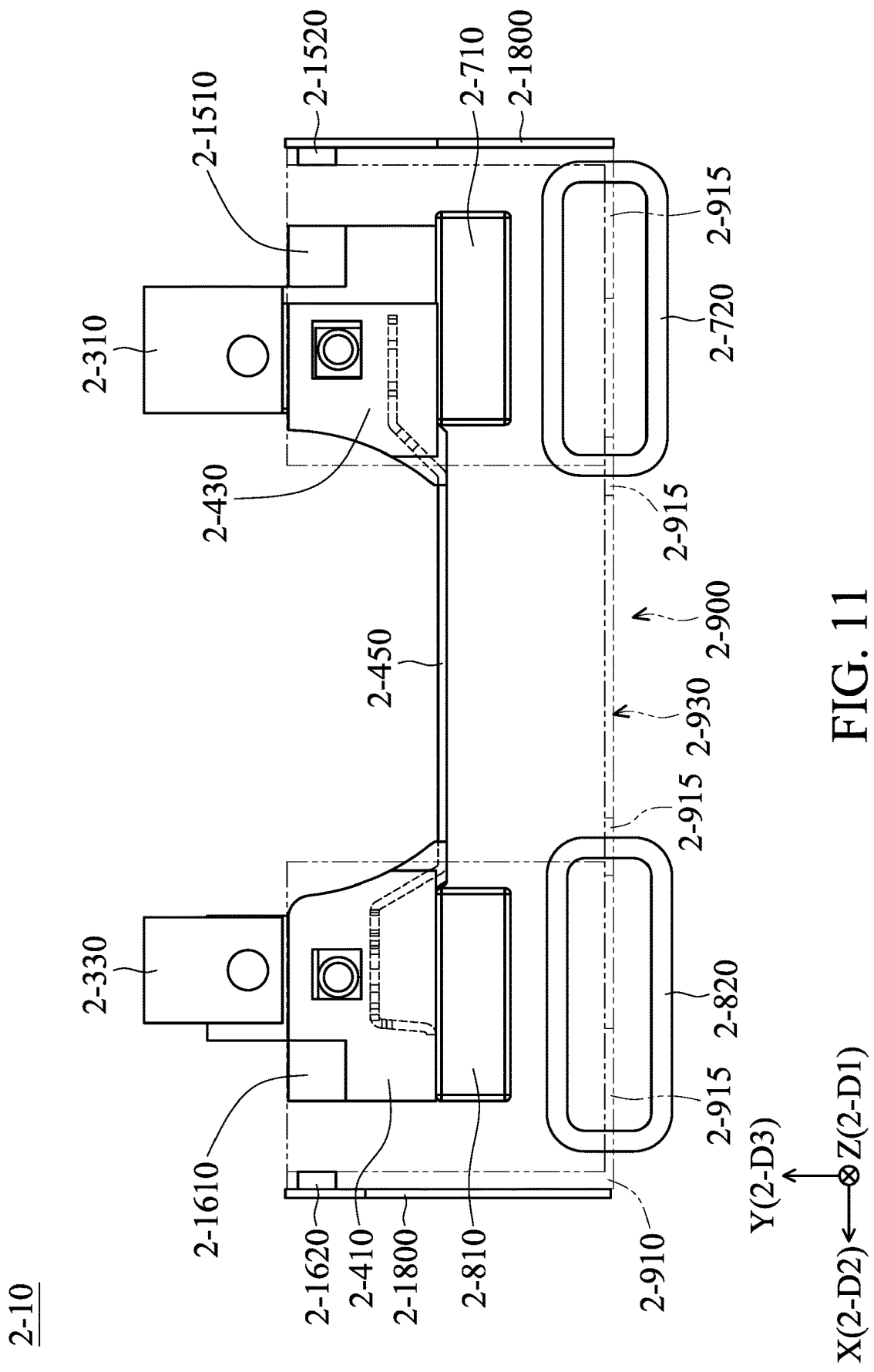
FIG. 11 is a right side view of the optical system, according to some embodiments of the present disclosure, wherein the first optical element and the second optical element are omitted.

Referring to FIG. 11, FIG. 11 is a right side view of the optical system 2-10, according to some embodiments of the present disclosure, wherein the first optical element 2-100 and the second optical element 2-200 are omitted. In some embodiments, when viewed in the first direction 2-D1 (i.e. in the view angle of FIG. 11), the first holder 2-310 and the second guiding portion 2-430 at least partially overlap, and the second holder 2-410 and the first guiding portion 2-330 at least partially overlap. In addition, as shown in FIG. 11, the second connecting portion 2-450 of the second movable portion 2-400 has a plate structure, and it is at least partially embedded in the second holder 2-410 and at least partially embedded in the second guiding portion 2-430. In the embodiment shown in FIG. 11, the embedded portions of the second connecting portion 2-450 have bent structures that may strengthen the connections with the second holder 2-410 and with the second guiding portion 2-430. However, the second connecting portion 2-450 may have any suitable shapes, it is not limited to the embodiment illustrated in the present disclosure. Similarly, the first connecting portion 2-350 of the first movable portion 2-300 has similar structures as the second connecting portion 2-450. The first connecting portion 2-350 is at least partially embedded in the first holder 2-310 and at least partially embedded in the first guiding portion 2-330.

In the present disclosure, the first movable portion 2-300 and the second movable portion 2-400 are movable in the first direction 2-D1 relative to the fixed portion 2-900. Referring back to FIG. 10, when the first movable portion 2-300 moves to the left until the first holder 2-310 is in contact with the fixed portion 2-900, the first movable portion 2-300 is at a first terminal position; when the first movable portion 2-300 carries the second movable portion 2-400 to move to the right together until the second holder 2-410 is in contact with the fixed portion 2-900, and the first movable portion 2-300 keeps moving to the right until the first guiding portion 2-330 is in contact with the second holder 2-410, the first movable portion 2-300 is at a second terminal position. The range of motion for the first movable portion 2-300 between the first terminal position and the second terminal position is defined as the first range of motion. The first movable portion 2-300 is movable relative to the fixed portion 2-900 within the first range of motion. When the first movable portion 2-300 is at the first terminal position, and the second movable portion 2-400 keeps moving to the left until the second guiding portion 2-430 is in contact with the first holder 2-310, the second movable portion 2-400 is at a third terminal position; when the first movable portion 2-300 carries the second movable portion 2-400 to move to the right together until the second holder 2-410 is in contact with the fixed portion 2-900, the second movable portion 2-400 is at a fourth terminal position. The range of motion for the second movable portion 2-400 between the third terminal position and the fourth terminal position is defined as the second range of motion. The second movable portion 2-400 is movable relative to the fixed portion 2-900 within the second range of motion. The first range of motion and the second range of motion are different. In some embodiments of the present disclosure, the second movable portion 2-400 is movable relative to the first movable portion 2-300. When the second movable portion 2-400 moves to the left relative to the first movable portion 2-300 until the second holder 2-410 is in contact with the first guiding portion 2-330, the second movable portion 2-400 is at a fifth terminal position; when the second movable portion 2-400 moves to the right relative to the first movable portion 2-300 until the first holder 2-310 is in contact with the second guiding portion 2-430, the second movable portion 2-400 is at a sixth terminal position. The range of motion for the second movable portion 2-400 between the fifth terminal position and the sixth terminal position is defined as the third range of motion. The second movable portion 2-400 is movable relative to the first movable portion 2-300 within the third range of motion. In some embodiments, the first range of motion is smaller than the second range of motion, and the third range of motion is smaller than the first range of motion.

Figure 12:
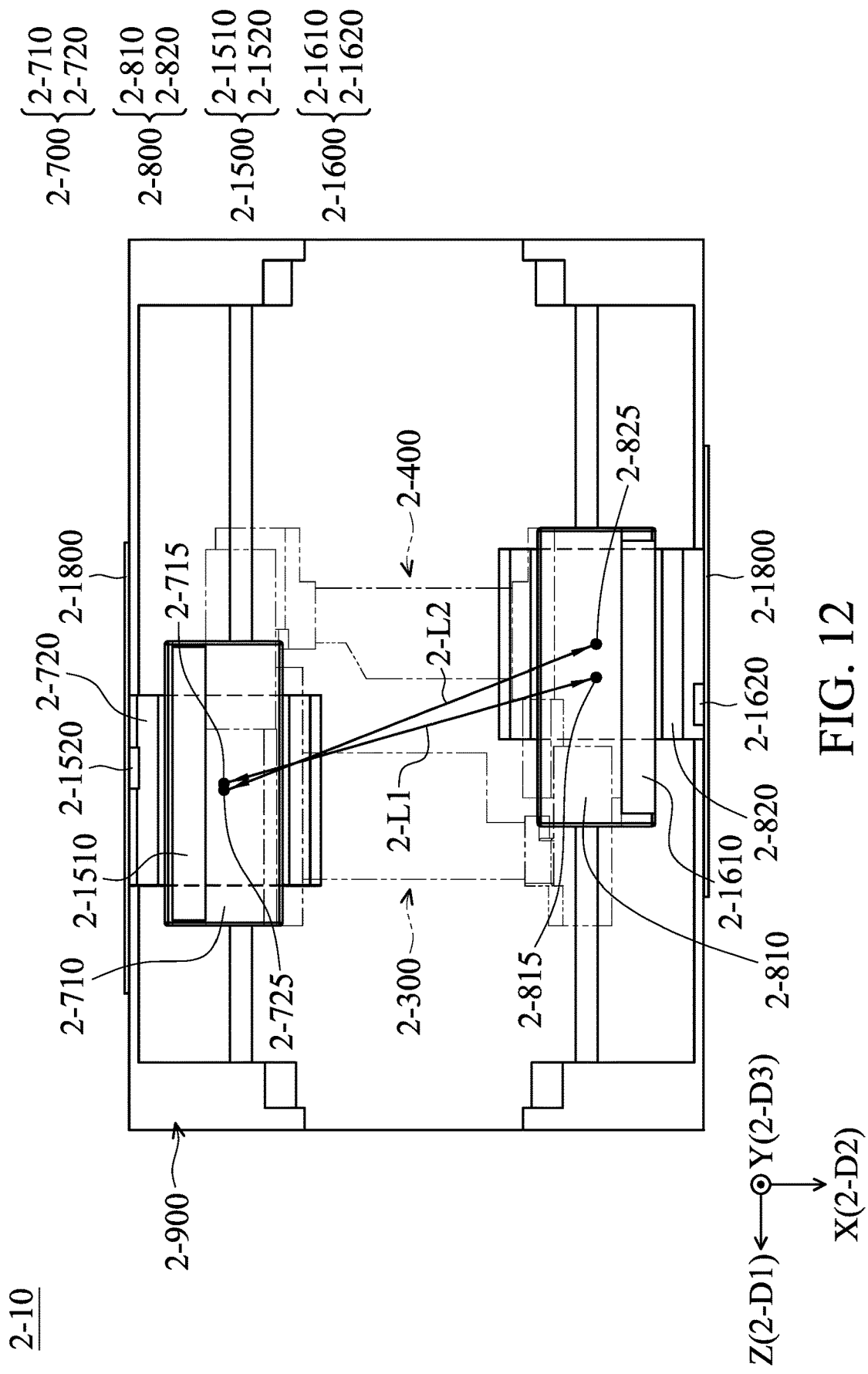
FIG. 12 is a top view of the optical system, according to some embodiments of the present disclosure, wherein the first optical element, the second optical element, the first movable portion, and the second movable portion are omitted.
Figure 13:
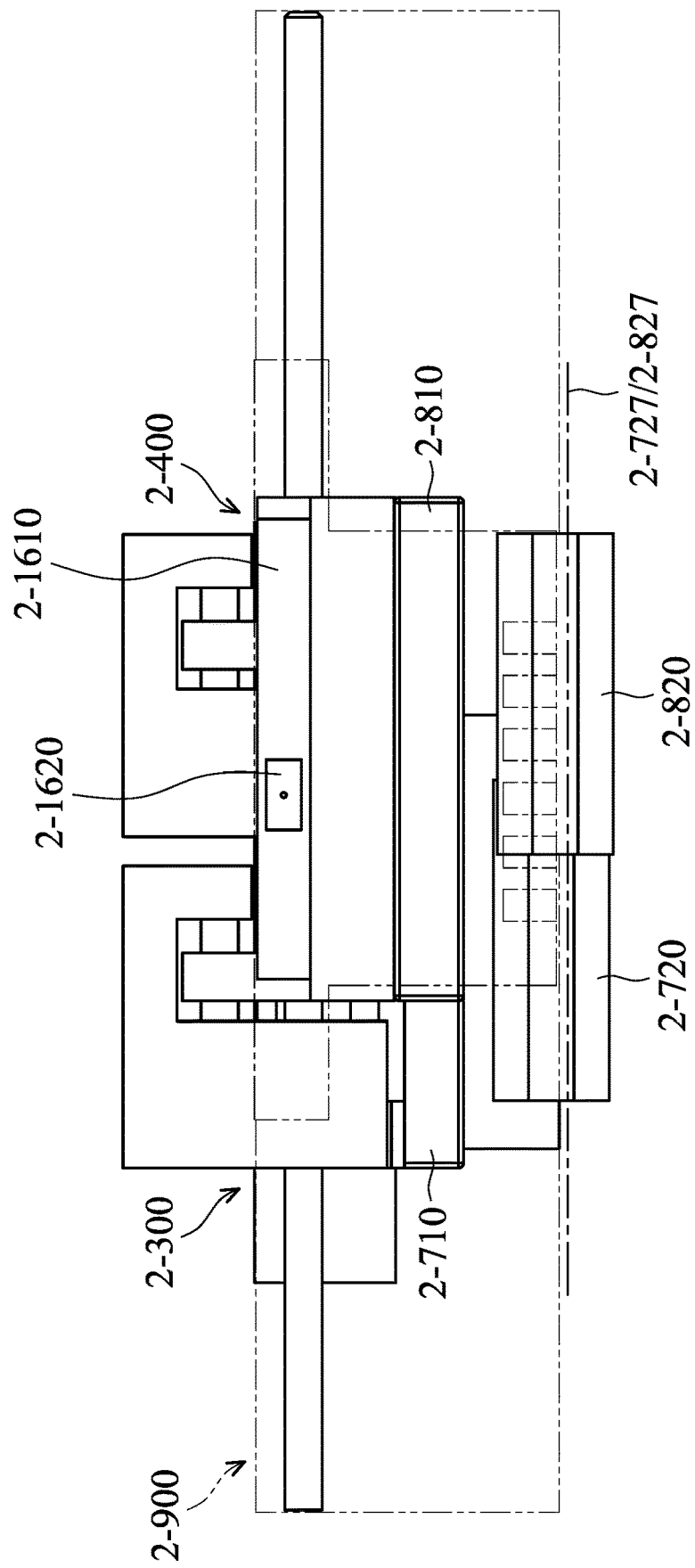
FIG. 13 is a front view of the optical system, according to some embodiments of the present disclosure.

Next, referring to FIG. 9 to FIG. 13, FIG. 12 is a top view of the optical system 2-10, according to some embodiments of the present disclosure, wherein the first optical element 2-100, the second optical element 2-200, the first movable portion 2-300, and the second movable portion 2-400 are omitted. FIG. 13 is a front view of the optical system 2-10, according to some embodiments of the present disclosure. As shown in FIG. 12, the first driving assembly 2-700 is at least partially disposed at the first holder 2-310, electrically connected to the circuit assembly 2-1800, and includes a first magnetic element 2-710 and a first coil 2-720. In some embodiments, the first magnetic element 2-710 is fixedly disposed at the first holder 2-310, and located at the opposite side from the first adherent surface 2-315 (see FIG. 10). The first coil 2-720 corresponds to the first magnetic element 2-710, and is disposed at the fixed portion 2-900. The first coil 2-720 has a first axis 2-727 (see FIG. 13). The direction that the first axis 2-727 extends in is parallel to the first direction 2-D1. The first movable portion 2-300 is driven to move relative to the fixed portion 2-900 by the electromagnetic driving force generated between the first magnetic element 2-710 and the first coil 2-720. Similarly, the second driving assembly 2-800 is at least partially disposed at the second holder 2-410, electrically connected to the circuit assembly 2-1800, and includes a second magnetic element 2-810 and a second coil 2-820. In some embodiments, the second magnetic element 2-810 is fixedly disposed at the second holder 2-410, and located at the opposite side from the third adherent surface 2-415 (see FIG. 10). The second coil 2-820 corresponds to the second magnetic element 2-810, and is disposed at the fixed portion 2-900. The second coil 2-820 has a second axis 2-827 (see FIG. 13). The direction that the second axis 2-827 extends in is parallel to the first direction 2-D1. The second movable portion 2-400 is driven to move relative to the fixed portion 2-900 by the electromagnetic driving force generated between the second magnetic element 2-810 and the second coil 2-820.

When viewed in the second direction 2-D2 (X direction) (FIG. 13), the first driving assembly 2-700 and the second driving assembly 2-800 at least partially overlap. For example, the first magnetic element 2-710 and the second magnetic element 2-810 at least partially overlap. Alternatively, the first coil 2-720 and the second coil 2-820 at least partially overlap. In addition, as shown in FIG. 13, when viewed in the second direction 2-D2, the first magnetic element 2-710 does not overlap the first coil 2-720, and the second magnetic element 2-810 does not overlap the second coil 2-820. In some embodiments, due to different ranges of movement of the first movable portion 2-300 and the second movable portion 2-400, the largest size of the first magnetic element 2-710 in the first direction 2-D1 is different from the largest size of the second magnetic element 2-810 in the first direction 2-D1. In some specific embodiments, the largest size of the first magnetic element 2-710 in the first direction 2-D1 is smaller than the largest size of the second magnetic element 2-810 in the first direction 2-D1. In some embodiments, the largest size of the first coil 2-720 in the first direction 2-D1 (or the extending direction of the first axis 2-727) is the same as the largest size of the second coil 2-820 in the first direction 2-D1.

When viewed in the third direction 2-D3 (Y direction) (FIG. 12), the first magnetic element 2-710 has a center 2-715, the first coil 2-720 has a center 2-725, the second magnetic element 2-810 has a center 2-815, and the second coil 2-820 has a center 2-825. The center 2-715 and the center 2-815 form a first line 2-L1. The first line 2-L1 is neither parallel nor perpendicular to the first direction 2-D1. The center 2-725 and the center 2-825 form a second line 2-L2. The second line 2-L2 is neither parallel nor perpendicular to the first direction 2-D1.

As shown in FIG. 11, in some embodiments, the fixed portion 2-900 includes a frame 2-910. The first optical element 2-100, the second optical element 2-200, the first movable portion 2-300, and the second movable portion 2-400 are all disposed within the frame 2-910. The first coil 2-720 and the second coil 2-820 are fixedly disposed at the frame 2-910. In the embodiment shown in FIG. 11, the frame 2-910 has a plurality of openings 2-915. The first coil 2-720 and the second coil 2-820 may go through the openings 2-915, and protrude from the frame 2-910. As shown in FIG. 11, the openings 2-915 may have any suitable sizes. For example, the two outer openings 2-915 may be bigger, and the two inner openings 2-915 may be smaller. In some embodiments, the frame 2-910 has a magnetic permeable material. In some specific embodiments, the frame 2-910 is made of a metal material.

In some embodiments according to the present disclosure, the optical system 2-10 further includes a first sensing assembly 2-1500 and a second sensing assembly 2-1600. The first sensing assembly 2-1500 is for sensing the movement of the first movable portion 2-300 relative to the fixed portion 2-900, and the second sensing assembly 2-1600 is for sensing the movement of the second movable portion 2-400 relative to the fixed portion 2-900. The first sensing assembly 2-1500 and the second sensing assembly 2-1600 may be any suitable position sensing assemblies, such as a Hall sensor, a Tunneling Magnetoresistance (TMR) effect sensor, a Giant Magnetoresistance (GMR) effect sensor, or any magnetic sensors.

Figure 14:
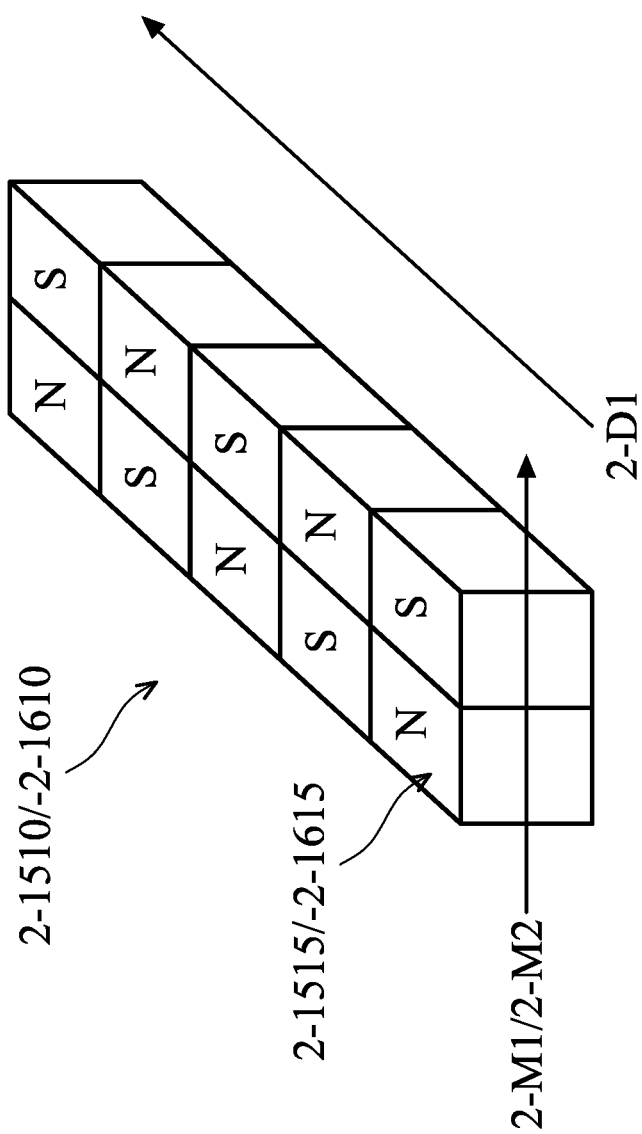
FIG. 14 is a schematic view of the structures of the first reference magnetic element and the second reference magnetic element, according to some embodiments of the present disclosure.
Figure 15:
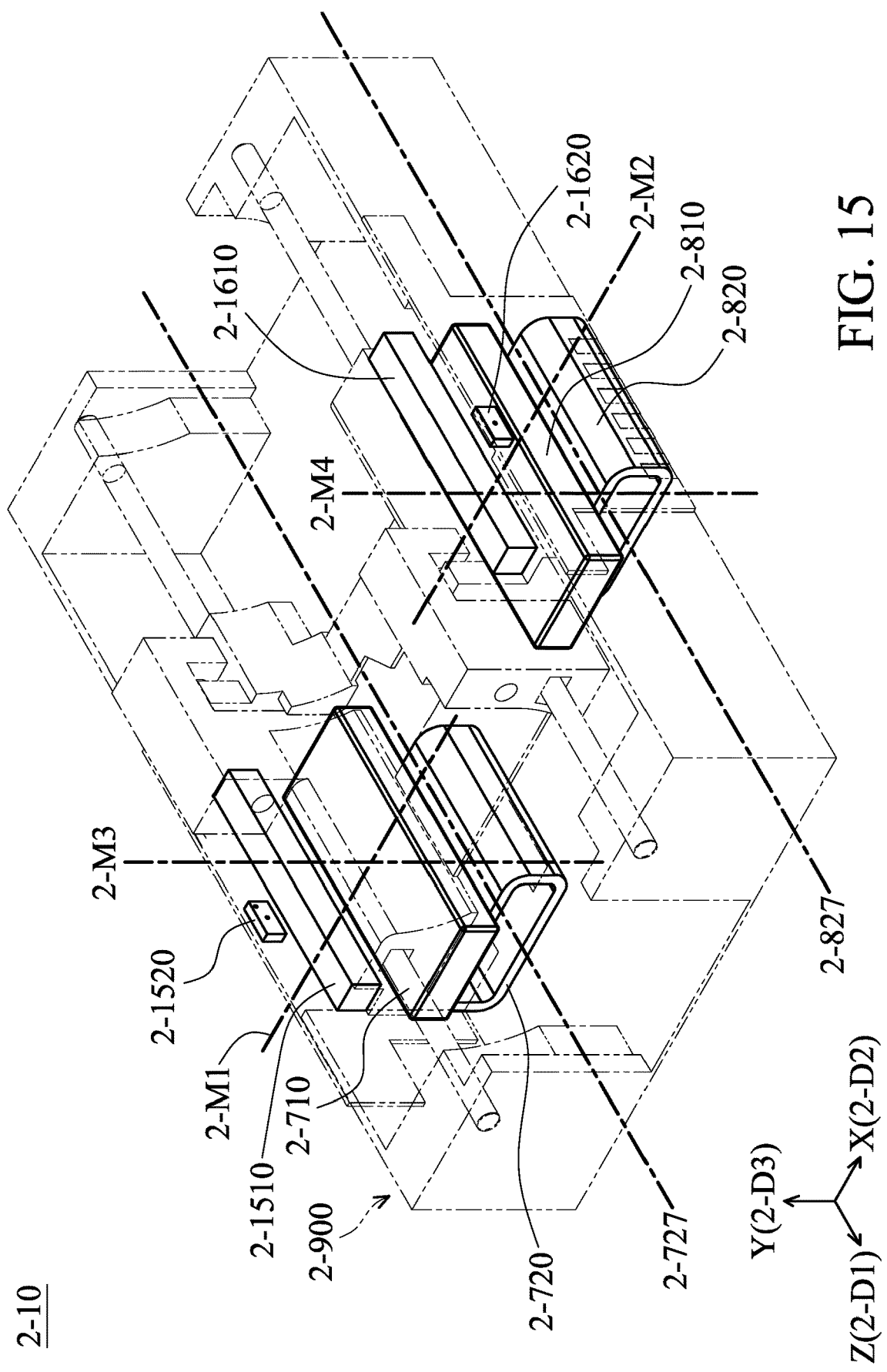
FIG. 15 is a perspective view of the optical system, according to some embodiments of the present disclosure, wherein the first optical element and the second optical element are omitted.

Next, referring to FIG. 14 and FIG. 15, FIG. 14 is a schematic view of the structures of the first reference magnetic element 2-1510 and the second reference magnetic element 2-1610, according to some embodiments of the present disclosure. FIG. 15 is a perspective view of the optical system 2-10, according to some embodiments of the present disclosure, wherein the first optical element 2-100 and the second optical element 2-200 are omitted. In some embodiments, the first sensing assembly 2-1500 includes a first reference magnetic element 2-1510 and a first sensor 2-1520. In some embodiments, the first reference magnetic element 2-1510 is fixedly disposed at the first movable portion 2-300. For example, the first reference magnetic element 2-1510 is disposed on the first holder 2-310. As shown in FIG. 14, the first reference magnetic element 2-1510 includes a plurality of first magnetic pole pairs 2-1515 that have N poles and S poles. Each of the first magnetic pole pairs 2-1515 includes a pair of magnetic poles consisting of an N pole and an S pole. The plurality of the first magnetic pole pairs 2-1515 are arranged in the first direction 2-D1. In each of the first magnetic pole pairs 2-1515, the N pole and the S pole are arranged in a first magnetic pole direction 2-M1. In this embodiment, the first magnetic pole direction 2-M1 is perpendicular to the first direction 2-D1. In some embodiments, the first sensor 2-1520 is fixedly disposed at the fixed portion 2-900, and corresponds to the first reference magnetic element 2-1510. When viewed in the first magnetic pole direction 2-M1, the first reference magnetic element 2-1510 and the first sensor 2-1520 at least partially overlap. In addition, in some embodiments, the largest size of the first reference magnetic element 2-1510 in the first direction 2-D1 is smaller than the largest size of the first magnetic element 2-710 in the first direction 2-D1.

Similarly, in some embodiments, the second sensing assembly 2-1600 includes a second reference magnetic element 2-1610 and a second sensor 2-1620. In some embodiments, the second reference magnetic element 2-1610 is fixedly disposed at the second movable portion 2-400. For example, the second reference magnetic element 2-1610 is disposed on the second holder 2-410. As shown in FIG. 14, the second reference magnetic element 2-1610 includes a plurality of second magnetic pole pairs 2-1615 that have N poles and S poles. Each of the second magnetic pole pairs 2-1615 includes a pair of magnetic poles consisting of an N pole and an S pole. The plurality of the second magnetic pole pairs 2-1615 are arranged in the first direction 2-D1. In each of the second magnetic pole pairs 2-1615, the N pole and the S pole are arranged in a second magnetic pole direction 2-M2. In this embodiment, the second magnetic pole direction 2-M2 is perpendicular to the first direction 2-D1. In some embodiments, the second sensor 2-1620 is fixedly disposed at the fixed portion 2-900, and corresponds to the second reference magnetic element 2-1610. When viewed in the second magnetic pole direction 2-M2, the second reference magnetic element 2-1610 and the second sensor 2-1620 at least partially overlap. In addition, in some embodiments, the largest size of the second reference magnetic element 2-1610 in the first direction 2-D1 is smaller than the largest size of the second magnetic element 2-810 in the first direction 2-D1.

In some embodiments, the first magnetic pole direction 2-M1 is parallel to the second magnetic pole direction 2-M2. In some embodiments, the first magnetic element 2-710 includes a pair of magnetic poles consisting of an N pole and an S pole, which are arranged in a third magnetic pole direction 2-M3. The second magnetic element 2-810 includes a pair of magnetic poles consisting of an N pole and an S pole, which are arranged in a fourth magnetic pole direction 2-M4. In some embodiments, the third magnetic pole direction 2-M3 is parallel to the fourth magnetic pole direction 2-M4. In some embodiments, the first magnetic pole direction 2-M1 is not parallel to the third magnetic pole direction 2-M3. In some embodiments, the first magnetic pole direction 2-M1 is not parallel to the fourth magnetic pole direction 2-M4. In some embodiments, the second magnetic pole direction 2-M2 is not parallel to the third magnetic pole direction 2-M3. In some embodiments, the second magnetic pole direction 2-M2 is not parallel to the fourth magnetic pole direction 2-M4. In some specific embodiments, the first magnetic pole direction 2-M1 is perpendicular to the third magnetic pole direction 2-M3, and the second magnetic pole direction 2-M2 is perpendicular to the fourth magnetic pole direction 2-M4, to prevent the magnetic interferences between the driving assemblies and the sensing assemblies. In addition, when viewed in the second direction 2-D2 (the view angle of FIG. 13), the first reference magnetic element 2-1510 and the second reference magnetic element 2-1610 at least partially overlap, and the first sensor 2-1520 and the second sensor 2-1620 do not overlap.

Figure 16:
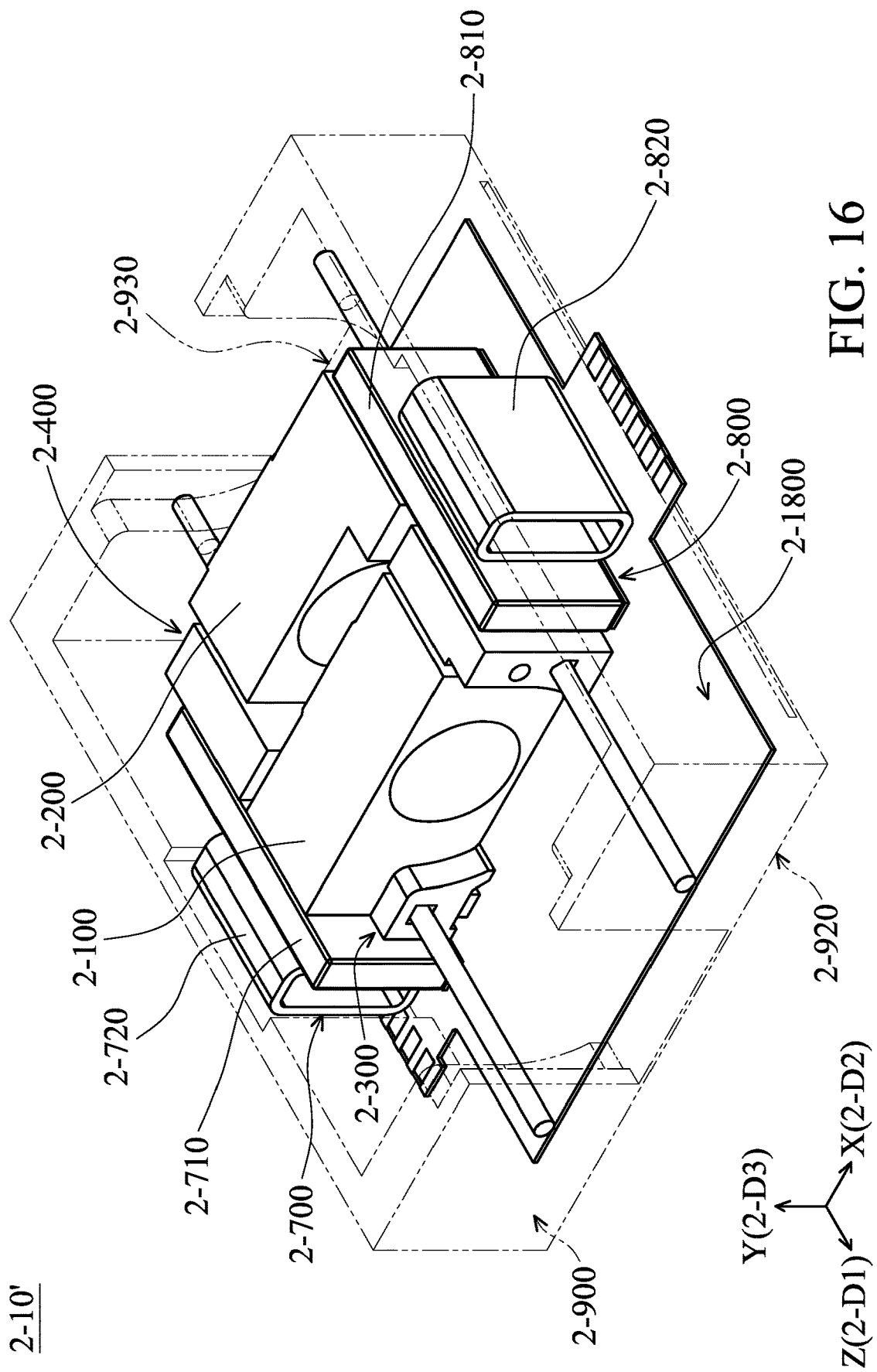
FIG. 16 is a perspective view of the optical system, according to some other embodiments of the present disclosure.
Figure 17:
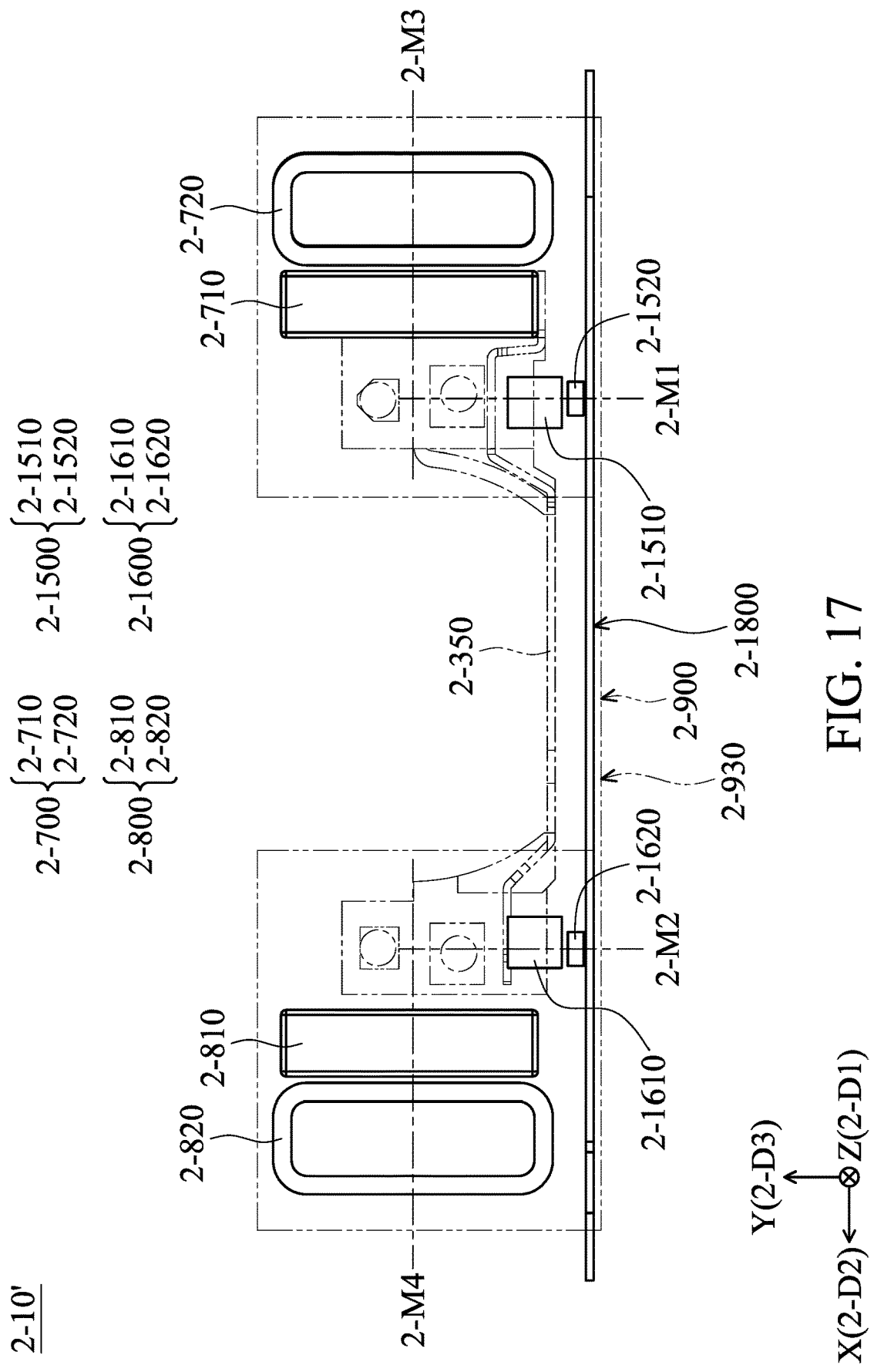
FIG. 17 is a right side view of the optical system, according to some other embodiments of the present disclosure, wherein the first optical element and the second optical element are omitted.

Next, referring to FIG. 16 and FIG. 17, FIG. 16 is a perspective view of the optical system 2-10', according to some other embodiments of the present disclosure. FIG. 17 is a right side view of the optical system 2-10', according to some other embodiments of the present disclosure, wherein the first optical element 2-100 and the second optical element 2-200 are omitted. In FIG. 16 and FIG. 17, each of the elements of the optical system 2-10' has the same or similar functions and structures as the elements of the optical system 2-10. The difference between them is that the elements may be positioned differently. Therefore, like reference numerals are used in the figures to represent the same or similar elements, and the detailed descriptions of these elements are not repeated.

As shown in FIG. 16 and FIG. 17, the optical system 2-10', similar to the optical system 2-10, includes a first optical element 2-100, a second optical element 2-200, a first movable portion 2-300, a second movable portion 2-400, a first driving assembly 2-700, a second driving assembly 2-800, a first sensing assembly 2-1500, a second sensing assembly 2-1600, and a circuit assembly 2-1800. However, in the optical system 2-10', as shown in FIG. 17, the first magnetic element 2-710 of the first driving assembly 2-700 is fixedly disposed on the side of the first movable portion 2-300 in the second direction 2-D2, so that the third magnetic pole direction 2-M3 of the first magnetic element 2-710 is parallel to the second direction 2-D2. Accordingly, the first coil 2-720 is disposed on the fixed portion 2-900, where the extending direction of the first axis 2-727 is still parallel to the first direction 2-D1. Similarly, the second magnetic element 2-810 of the second driving assembly 2-800 is fixedly disposed on the side of the second movable portion 2-400 in the second direction 2-D2, so that the fourth magnetic pole direction 2-M4 of the second magnetic element 2-810 is parallel to the second direction 2-D2. Accordingly, the second coil 2-820 is disposed on the fixed portion 2-900, where the extending direction of the second axis 2-827 is still parallel to the first direction 2-D1.

In some embodiments, when viewed in the second direction 2-D2, the first driving assembly 2-700 and the second driving assembly 2-800 at least partially overlap. For example, the first magnetic element 2-710 and the second magnetic element 2-810 at least partially overlap. Alternatively, the first coil 2-720 and the second coil 2-820 at least partially overlap. In addition, as shown in FIG. 17, when viewed in the first direction 2-D1, the first magnetic element 2-710 and the first coil 2-720 do not overlap, and the second magnetic element 2-810 and the second coil 2-820 do not overlap.

In the optical system 2-10', the first reference magnetic element 2-1510 of the first sensing assembly 2-1500 is fixedly disposed at the first movable portion 2-300. For example, the first reference magnetic element 2-1510 is on the surface that is on the opposite side from the first adherent surface 2-315 on the first holder 2-310. As described above with regard to FIG. 14, the first reference magnetic element 2-1510 has a plurality of first magnetic pole pairs 2-1515. In this embodiment, the first magnetic pole pairs 2-1515 are also arranged in the first direction 2-D1. Also, the first magnetic pole direction 2-M1 is perpendicular to the first direction 2-D1. However, it should be noted that the first magnetic pole direction 2-M1 of the optical system 2-10 is parallel to the second direction 2-D2, while the first magnetic pole direction 2-M1 of the optical system 2-10' is parallel to the third direction 2-D3. Accordingly, the first sensor 2-1520 is fixedly disposed at the fixed portion 2-900, and corresponds to the first reference magnetic element 2-1510. When viewed in the first magnetic pole direction 2-M1, the first reference magnetic element 2-1510 and the first sensor 2-1520 at least partially overlap.

Similarly, in the optical system 2-10', the second reference magnetic element 2-1610 of the second sensing assembly 2-1600 is fixedly disposed at the second movable portion 2-400. For example, the second reference magnetic element 2-1610 is on the surface that is on the opposite side from the third adherent surface 2-415 on the second holder 2-410. As described above with regard to FIG. 14, the second reference magnetic element 2-1610 has a plurality of second magnetic pole pairs 2-1615. In this embodiment, the second magnetic pole pairs 2-1615 are also arranged in the first direction 2-D1. Also, the second magnetic pole direction 2-M2 is perpendicular to the first direction 2-D1. However, it should be noted that the second magnetic pole direction 2-M2 of the optical system 2-10 is parallel to the second direction 2-D2, while the second magnetic pole direction 2-M2 of the optical system 2-10' is parallel to the third direction 2-D3. Accordingly, the second sensor 2-1620 is fixedly disposed at the fixed portion 2-900, and corresponds to the second reference magnetic element 2-1610. When viewed in the second magnetic pole direction 2-M2, the second reference magnetic element 2-1610 and the second sensor 2-1620 at least partially overlap.

In the embodiment shown in FIG. 17, the first magnetic pole direction 2-M1 is parallel to the second magnetic pole direction 2-M2, and the third magnetic pole direction 2-M3 is parallel to the fourth magnetic pole direction 2-M4. To prevent the magnetic interferences between the driving assemblies and the sensing assemblies, the first magnetic pole direction 2-M1 is perpendicular to the third magnetic pole direction 2-M3, and the second magnetic pole direction 2-M2 is perpendicular to the fourth magnetic pole direction 2-M4.

Figure 18:
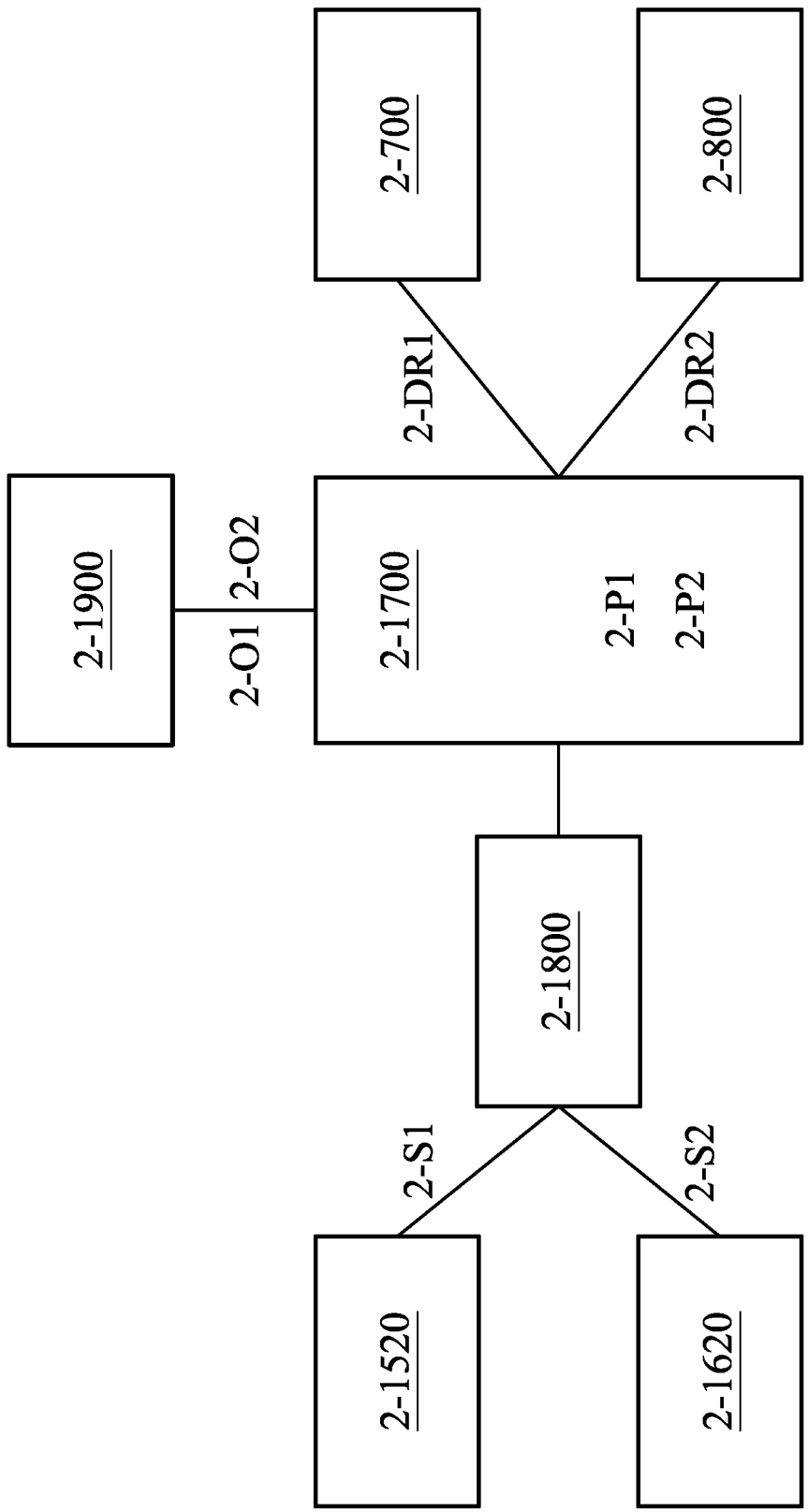
FIG. 18 is a schematic view of the connection of the control unit of the optical system, according to some embodiments of the present disclosure.

Next, referring to FIG. 18, FIG. 18 is a schematic view of the connection of the control unit 2-1700 of the optical system 2-10, according to some embodiments of the present disclosure. In some embodiments, the optical system 2-10 (or the optical system 2-10') further includes a control unit 2-1700. The control unit 2-1700 has first predetermined information 2-P1 and second predetermined information 2-P2. The first predetermined information 2-P1 includes the status of a first magnetic field of the first reference magnetic element 2-1510 for each possible location of the first movable portion 2-300 relative to the fixed portion 2-900. The second predetermined information 2-P2 includes the status of a second magnetic field of the second reference magnetic element 2-1610 for each possible location of the second movable portion 2-400 relative to the fixed portion 2-900. The control unit 2-1700 is electrically connected to the first sensor 2-1520 and the second sensor 2-1620 via the circuit assembly 2-1800. The first sensor 2-1520 outputs a first sensing signal 2-S1 to the control unit 2-1700, and the second sensor 2-1620 outputs a second sensing signal 2-S2 to the control unit 2-1700. After the control unit 2-1700 receives the first sensing signal 2-S1 and the second sensing signal 2-S2, it may calculate the position of the first movable portion 2-300 relative to the fixed portion 2-900 based on the first sensing signal 2-S1 and the first predetermined information 2-P1, and calculate the position of the second movable portion 2-400 relative to the fixed portion 2-900 based on the second sensing signal 2-S2 and the second predetermined information 2-P2.

Based on the calculated position(s) of the first movable portion 2-300 and/or the second movable portion 2-400, an external controller 2-1900 may output a first instruction 2-O1 and/or a second instruction 2-O2 to the control unit 2-1700. The control unit 2-1700 may output a first driving signal 2-DR1 to the first driving assembly 2-700 based on the first instruction 2-O1, driving the first movable portion 2-300 to move. In some embodiments, the movement of the first movable portion 2-300 may change the focal length of the optical unit (e.g. including the first optical element 2-100, the second optical element 2-200, and the first movable portion 2-300), so that the optical system 2-10 performs the function of zooming. The control unit 2-1700 may output a second driving signal 2-DR2 to the second driving assembly 2-800 based on the second instruction 2-O2, driving the second movable portion 2-400 to move. In some embodiments, the movement of the second movable portion 2-400 may change the image plane of the optical unit, so that the optical system 2-10 performs the function of focusing.

In some embodiments, first, the control unit 2-1700 outputs the first driving signal 2-DR1 to the first driving assembly 2-700. After the first driving assembly 2-700 drives the first movable portion 2-300 to move, and after the first movable portion 2-300 arrives at its desired position, the control unit 2-1700 then outputs the second driving signal 2-DR2 to the second driving assembly 2-800, so that the second driving assembly 2-800 drives the second movable portion 2-400 to move to its desired position. In other words, the control unit 2-1700 may control the optical system 2-10 to perform zooming before focusing. This precise control of positions may achieve better optical effects.

In summary, the optical system 2-10 of the present disclosure includes a plurality of optical elements (e.g. the first optical element 2-100 and the second optical element 2-200). A plurality of driving assemblies (e.g. the first driving assembly 2-700 and the second driving assembly 2-800) are used to drive the optical elements to move relative to the fixed portion 2-900 and/or relative to each other, achieving effects of optical zooming or optical focusing, or the like. A plurality of sensing assemblies (e.g. the first sensing assembly 2-1500 and the second sensing assembly 2-1600) are used to precisely control the positions of the optical elements. Additionally, according to the configurations for the driving assemblies and the sensing assemblies, the interference generated by the magnetic fields of the magnetic elements thereof may be prevented. This improves the optical quality and stability of the optical system by maintaining good driving effects and sensing effects. Further, two different configurations of optical system 2-10 and optical system 2-10' are provided, which is helpful to improve the compatibility and usability of the overall mechanism.

The third embodiment of the present disclosure is described below.

An optical system is provided in the present disclosure, including a plurality of optical elements. These optical elements are movable relative to each other for optical zooming or focusing effects. In some embodiments, during operation, in order to reduce the tilting of optical elements, the first optical element carries the second optical element to move when it does. After the first optical element arrives at the desired position, the second optical element is then finely adjusted, so that the second optical element moves to the desired position. In some embodiments, each of the optical elements in the optical system is connected to a movable portion. Each movable portion is driven to move by a driving assembly (e.g. including a magnetic element and a coil). The position of the movable portion is sensed by a sensing assembly (e.g. including a reference magnetic element and a sensor). In the optical system provided in the present disclosure, one of the movable portions is movably connected to the fixed portion via a flexible circuit assembly. This circuit assembly is also connected to a sensor for sensing the relative motion between the two movable portions. This configuration provides good sensing effects and improves the optical quality of the optical system.

Figure 19:
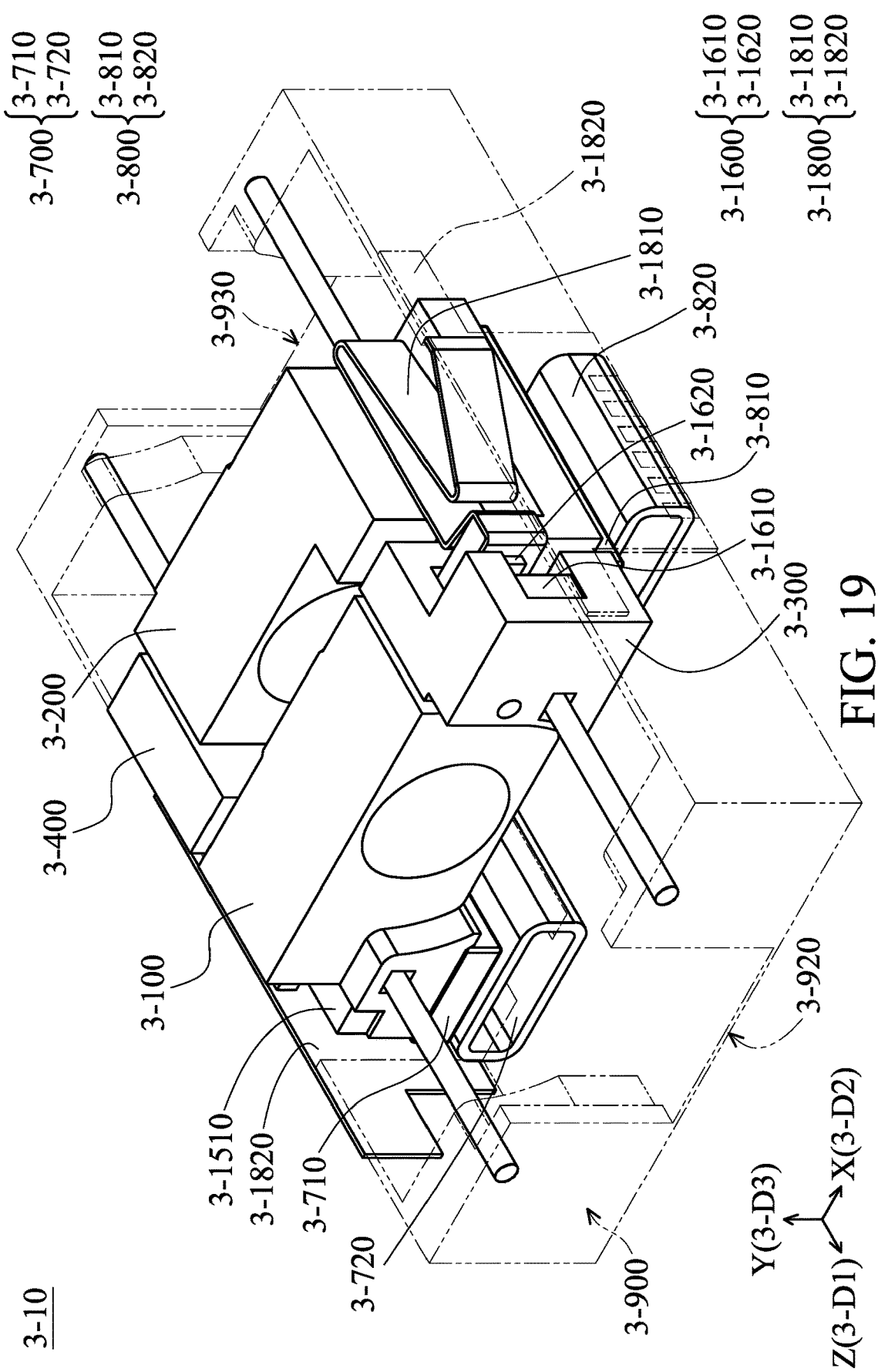
FIG. 19 is a perspective view of the optical system, according to some embodiments of the present disclosure.

Referring to FIG. 19, FIG. 19 is a perspective view of the optical system 3-10, according to some embodiments of the present disclosure. As shown in FIG. 19, the optical system 3-10 mainly includes a first optical element 3-100, a second optical element 3-200, a first movable portion 3-300, a second movable portion 3-400, a first driving assembly 3-700, a second driving assembly 3-800, a fixed portion 3-900, and a circuit assembly 3-1800. In some embodiments, the first optical element 3-100 and the second optical element 3-200 may each include one or more lenses, forming individual lens groups. In some specific embodiments, the first optical element 3-100 is for optical zooming, and the second optical element 3-200 is for optical focusing. Of course, the functions of the first optical element 3-100 and the second optical element 3-200 may be adjusted or exchanged based on requirements of users. In the embodiment shown in FIG. 19, the first optical element 3-100 is connected to the first movable portion 3-300. The first movable portion 3-300 and the first optical element 3-100 are driven by the first driving assembly 3-700 to move relative to the fixed portion 3-900. Similarly, the second optical element 3-200 is connected to the second movable portion 3-400. The second movable portion 3-400 and the second optical element 3-200 are driven by the second driving assembly 3-800 to move relative to the fixed portion 3-900. It should be noted that the second movable portion 3-400 is movable relative to the first movable portion 3-300, which will be described in details below.

Figure 20:
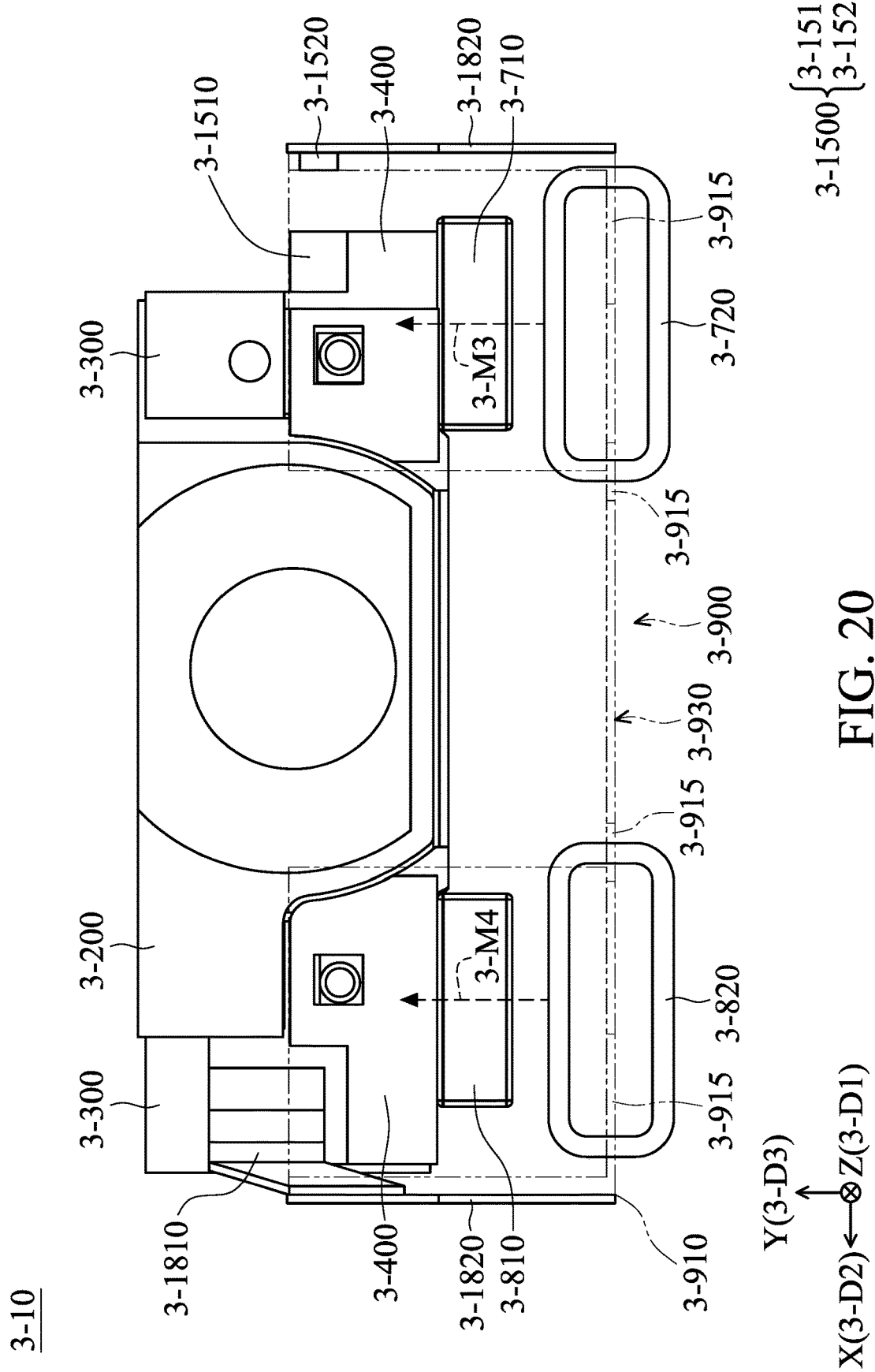
FIG. 20 is a right side view of the optical system, according to some embodiments of the present disclosure.

Next, referring to FIG. 19 and FIG. 20, FIG. 20 is a right side view of the optical system 3-10, according to some embodiments of the present disclosure. As shown in FIG. 20, the first driving assembly 3-700 includes a first magnetic element 3-710 and a first coil 3-720. The first driving assembly 3-700 is at least partially disposed at the first movable portion 3-300. In some embodiments, the first magnetic element 3-710 is fixedly disposed at the first movable portion 3-300. The first coil 3-720 corresponds to the first magnetic element 3-710, and is disposed at the fixed portion 3-900. The first movable portion 3-300 is driven to move relative to the fixed portion 3-900 by the electromagnetic driving force generated between the first magnetic element 3-710 and the first coil 3-720. Similarly, the second driving assembly 3-800 includes a second magnetic element 3-810 and a second coil 3-820. The second driving assembly 3-800 is at least partially disposed at the second movable portion 3-400. In some embodiments, the second magnetic element 3-810 is fixedly disposed at the second movable portion 3-400. The second coil 3-820 corresponds to the second magnetic element 3-810, and is disposed at the fixed portion 3-900. The second movable portion 3-400 is driven to move relative to the fixed portion 3-900 and the first movable portion 3-300 by the electromagnetic driving force generated between the second magnetic element 3-810 and the second coil 3-820.

As shown in FIG. 20, in some embodiments, the fixed portion 3-900 includes a frame 3-910. The first optical element 3-100, the second optical element 3-200, the first movable portion 3-300, and the second movable portion 3-400 are all disposed within the frame 3-910. The first coil 3-720 and the second coil 3-820 are fixedly disposed at the frame 3-910. In the embodiment shown in FIG. 20, the frame 3-910 has a plurality of openings 3-915. The first coil 3-720 and the second coil 3-820 may go through the openings 3-915, and protrude from the frame 3-910. As shown in FIG. 20, the openings 3-915 may have any suitable sizes. For example, the two outer openings 3-915 may be bigger, and the two inner openings 3-915 may be smaller. In some embodiments, the frame 3-910 has a magnetic permeable material. In some specific embodiments, the frame 3-910 is made of a metal material.

Figure 21:
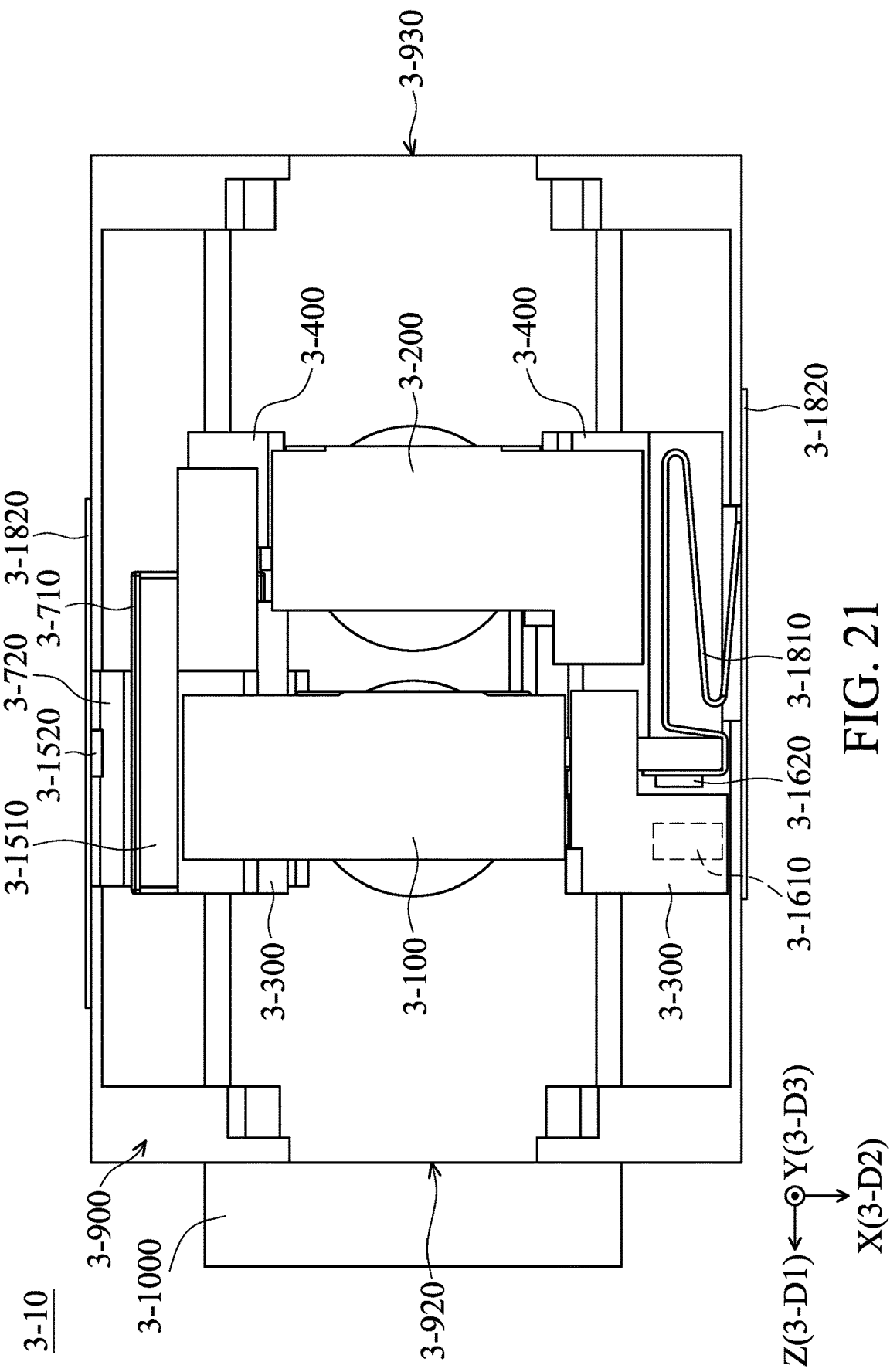
FIG. 21 is a top view of the optical system, according to some embodiments of the present disclosure.

Referring to FIG. 21, FIG. 21 is a top view of the optical system 3-10, according to some embodiments of the present disclosure. In the present disclosure, the first movable portion 3-300 and the second movable portion 3-400 are arranged in the first direction 3-D1. The first movable portion 3-300 and the second movable portion 3-400 are movable in the first direction 3-D1 relative to the fixed portion 3-900. Referring to FIG. 21, when the first movable portion 3-300 moves to the left until the first movable portion 3-300 is in contact with the fixed portion 3-900, the first movable portion 3-300 is at a first terminal position; when the first movable portion 3-300 carries the second movable portion 3-400 to move to the right together until the second movable portion 3-400 is in contact with the fixed portion 3-900, and the first movable portion 3-300 keeps moving to the right until the first movable portion 3-300 abuts against the second movable portion 3-400, the first movable portion 3-300 is at a second terminal position. The range of motion for the first movable portion 3-300 between the first terminal position and the second terminal position is defined as the first range of motion. The first movable portion 3-300 is movable relative to the fixed portion 3-900 within the first range of motion. When the first movable portion 3-300 is at the first terminal position, and the second movable portion 3-400 keeps moving to the left until the second movable portion 3-400 abuts against the first movable portion 3-300, the second movable portion 3-400 is at a third terminal position; when the first movable portion 3-300 carries the second movable portion 3-400 to move to the right together until the second movable portion 3-400 is in contact with the fixed portion 3-900, the second movable portion 3-400 is at a fourth terminal position. The range of motion for the second movable portion 3-400 between the third terminal position and the fourth terminal position is defined as the second range of motion. The second movable portion 3-400 is movable relative to the fixed portion 3-900 within the second range of motion. The first range of motion and the second range of motion are different. In some embodiments of the present disclosure, the second movable portion 3-400 is movable relative to the first movable portion 3-300. When the second movable portion 3-400 moves to the left relative to the first movable portion 3-300 until the second movable portion 3-400 abuts against the first movable portion 3-300, the second movable portion 3-400 is at a fifth terminal position; when the second movable portion 3-400 moves to the right relative to the first movable portion 3-300 until the second movable portion 3-400 abuts against the first movable portion 3-300, the second movable portion 3-400 is at a sixth terminal position. The range of motion for the second movable portion 3-400 between the fifth terminal position and the sixth terminal position is defined as the third range of motion. The second movable portion 3-400 is movable relative to the first movable portion 3-300 within the third range of motion. In some embodiments, the first range of motion is smaller than the second range of motion, and the third range of motion is smaller than the first range of motion.

In addition, according to some embodiments of the present disclosure, the fixed portion 3-900 includes a light entrance 3-920 and a light exit 3-930. Lights enter the optical system 3-10 through the light entrance 3-920, and leave the optical system 3-10 through the light exit 3-930. In some embodiments, the optical system 3-10 further includes a third optical element 3-1000. The third optical element 3-1000 may include one or more lenses, forming an individual lens group. The third optical element 3-1000 may be fixedly disposed at the fixed portion 3-900. In the embodiment shown in FIG. 21, the third optical element 3-1000 is disposed on the side where the light entrance 3-920 of the fixed portion 3-900 is. However, in some other embodiments, the third optical element 3-1000 may also be disposed on the side where the light exit 3-930 is. Alternatively, one third optical element 3-1000 may be disposed respectively on the light entrance 3-920 and on the light exit 3-930. The third optical element 3-1000 may form an optical unit with the first optical element 3-100 and the second optical element 3-200, for determining the optical effects of the optical system 3-10.

Referring to FIG. 21, in some embodiments according to the present disclosure, the optical system 3-10 further includes a first sensing assembly 3-1500 and a second sensing assembly 3-1600. The first sensing assembly 3-1500 is for sensing the movement of the first movable portion 3-300 relative to the fixed portion 3-900, and the second sensing assembly 3-1600 is for sensing the movement of the second movable portion 3-400 relative to the first movable portion 3-300. The first sensing assembly 3-1500 and the second sensing assembly 3-1600 may be any suitable position sensing assemblies, such as a Hall sensor, a Tunneling Magnetoresistance (TMR) effect sensor, a Giant Magnetoresistance (GMR) effect sensor, or any magnetic sensors.

In some embodiments, the first sensing assembly 3-1500 includes a first reference magnetic element 3-1510 and a first sensor 3-1520. In some embodiments, the first reference magnetic element 3-1510 is fixedly disposed at the first movable portion 3-300. In some embodiments, the first sensor 3-1520 is fixedly disposed at the fixed portion 3-900, and corresponds to the first reference magnetic element 3-1510. In addition, in some embodiments, the largest size of the first reference magnetic element 3-1510 in the first direction 3-D1 is smaller than the largest size of the first magnetic element 3-710 in the first direction 3-D1.

In some embodiments, the second sensing assembly 3-1600 includes a second reference magnetic element 3-1610 and a second sensor 3-1620. In some embodiments, the second reference magnetic element 3-1610 is fixedly disposed at the first movable portion 3-300. In some embodiments, the second sensor 3-1620 is fixedly disposed at the second movable portion 3-400, and corresponds to the second reference magnetic element 3-1610. In addition, in some embodiments, the largest size of the second reference magnetic element 3-1610 in the first direction 3-D1 is smaller than the largest size of the second magnetic element 3-810 in the first direction 3-D1. Moreover, in some embodiments, since the first magnetic element 3-710 and the second magnetic element 3-810 share the same size, the largest size of the second reference magnetic element 3-1610 in the first direction 3-D1 is smaller than the largest size of the first magnetic element 3-710 in the first direction 3-D1 as well. It should be noted that the second sensing assembly 3-1600 is for sensing the relative position between the first movable portion 3-300 and the second movable portion 3-400. Therefore, in some other embodiments, the locations of the second reference magnetic element 3-1610 and the second sensor 3-1620 may be exchanged. For example, the second reference magnetic element 3-1610 may be fixedly disposed at the second movable portion 3-400, while the second sensor 3-1620 may be fixedly disposed at the first movable portion 3-300. In the embodiment shown in FIG. 21, the second sensor 3-1620 is disposed at the second movable portion 3-400, and is electrically connected to the first circuit element 3-1810 that is connected to the second movable portion 3-400.

Figure 22:
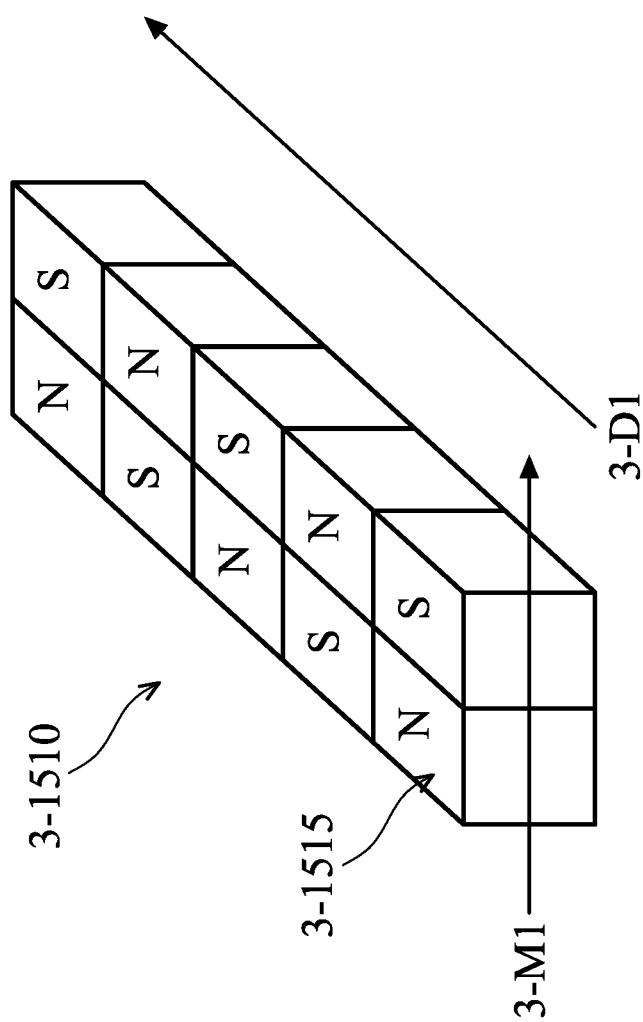
FIG. 22 is a schematic view of the structure of the first reference magnetic element, according to some embodiments of the present disclosure.

Referring to FIG. 22, FIG. 22 is a schematic view of the structure of the first reference magnetic element 3-1510, according to some embodiments of the present disclosure. As shown in FIG. 22, the first reference magnetic element 3-1510 includes a plurality of first magnetic pole pairs 3-1515 that have N poles and S poles. Each of the first magnetic pole pairs 3-1515 includes a pair of magnetic poles consisting of an N pole and an S pole. The plurality of the first magnetic pole pairs 3-1515 are arranged in the first direction 3-D1. In each of the first magnetic pole pairs 3-1515, the N pole and the S pole are arranged in a first magnetic pole direction 3-M1. In this embodiment, the first magnetic pole direction 3-M1 is perpendicular to the first direction 3-D1. When viewed in the first magnetic pole direction 3-M1, the first reference magnetic element 3-1510 and the first sensor 3-1520 at least partially overlap. It should be noted that the first magnetic element 3-710 that is located on the same side as the first reference magnetic element 3-1510 also has a pair of magnetic poles consisting of an N pole and an S pole. The direction that this pair of N pole and S pole are arranged in is defined as the third magnetic pole direction 3-M3 (see FIG. 20). In some embodiments, the first magnetic pole direction 3-M1 and the third magnetic pole direction 3-M3 are not parallel. When viewed in the third magnetic pole direction 3-M3, the first magnetic element 3-710 at least partially overlaps the first reference magnetic element 3-1510.

Figure 23:
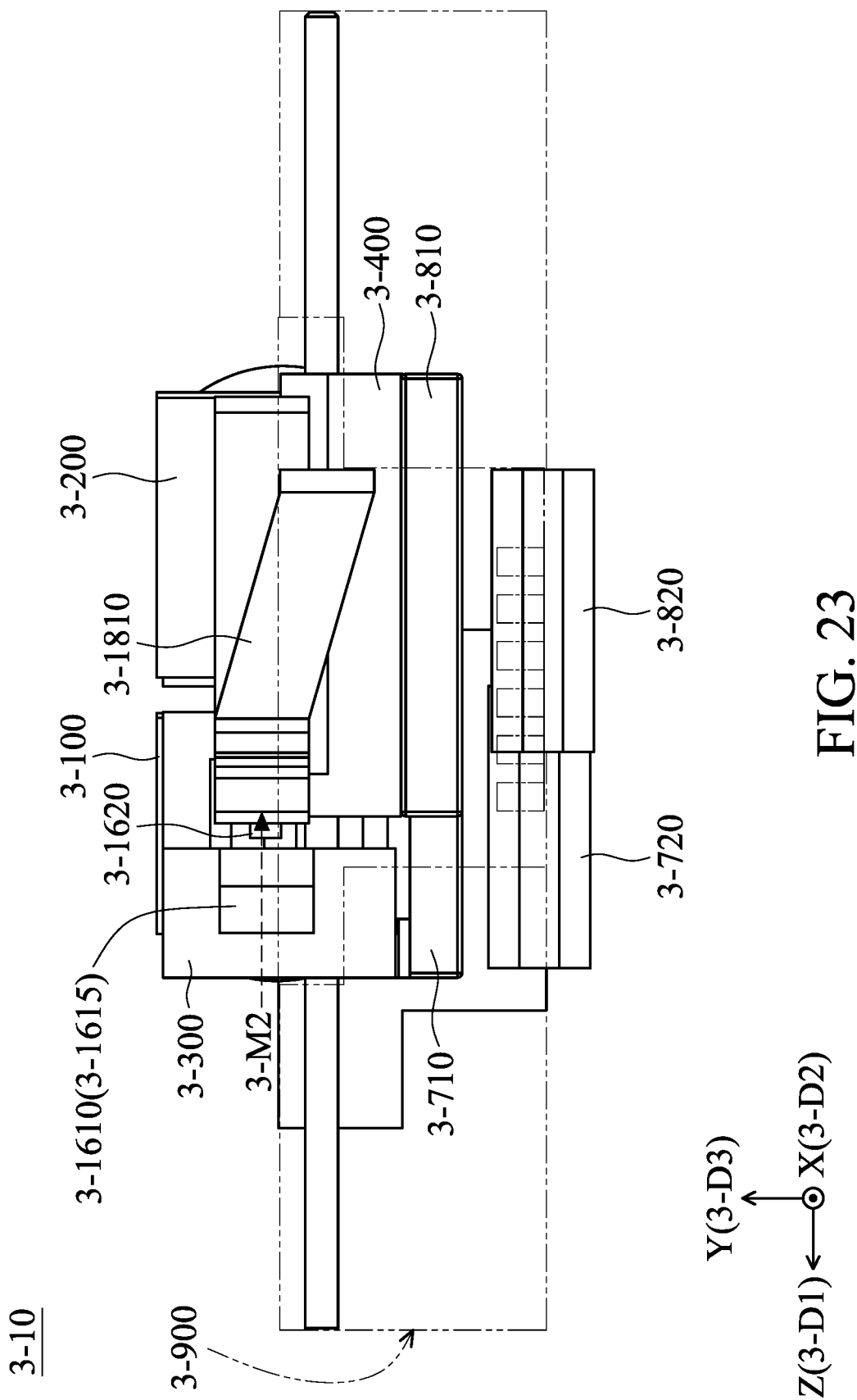
FIG. 23 is a front view of the optical system, according to some embodiments of the present disclosure.

Referring to FIG. 23, FIG. 23 is a front view of the optical system 3-10, according to some embodiments of the present disclosure. As shown in FIG. 23, the second reference magnetic element 3-1610 includes a second magnetic pole pair 3-1615 that have an N pole and an S pole. In the second magnetic pole pair 3-1615, the N pole and the S pole are arranged in a second magnetic pole direction 3-M2. In this embodiment, the second magnetic pole direction 3-M2 is parallel to the first direction 3-D1. It should be noted that the second magnetic element 3-810 that is located on the same side as the second reference magnetic element 3-1610 also has a pair of magnetic poles consisting of an N pole and an S pole. The direction that this pair of N pole and S pole are arranged in is defined as the fourth magnetic pole direction 3-M4 (see FIG. 20). In some embodiments, the second magnetic pole direction 3-M2 and the fourth magnetic pole direction 3-M4 are not parallel. When viewed in the fourth magnetic pole direction 3-M4, the second magnetic element 3-810 does not overlap the second reference magnetic element 3-1610.

In some embodiments, in the first direction 3-D1, the largest size of the second reference magnetic element 3-1610 is smaller than the largest size of the first reference magnetic element 3-1510. In some embodiments, the first magnetic direction 3-M1 is not parallel to the second magnetic direction 3-M2. More specifically, in some embodiments, the first magnetic direction 3-M1 is perpendicular to the second magnetic direction 3-M2. In some embodiment, the third magnetic direction 3-M3 is parallel to the fourth magnetic direction 3-M4. In these embodiments, since the first magnetic direction 3-M1 is not parallel to the third magnetic direction 3-M3, it is not parallel to the fourth magnetic direction 3-M4 as well. In turn, since the second magnetic direction 3-M2 is not parallel to the fourth magnetic direction 3-M4, it is not parallel to the third magnetic direction 3-M3 as well. It should be noted that the magnetic directions that are not parallel to each other may prevent the magnetic interferences between the driving assemblies and the sensing assemblies, and improve the stability of the mechanism.

In some embodiments, when viewed in the second direction 3-D2 that is perpendicular to the first direction 3-D1, the first reference magnetic element 3-1510 at least partially overlaps the second reference magnetic element 3-1610. In some embodiments, when viewed in the second direction 3-D2, the first sensor 3-1520 does not overlap the second sensor 3-1620.

Figure 24:
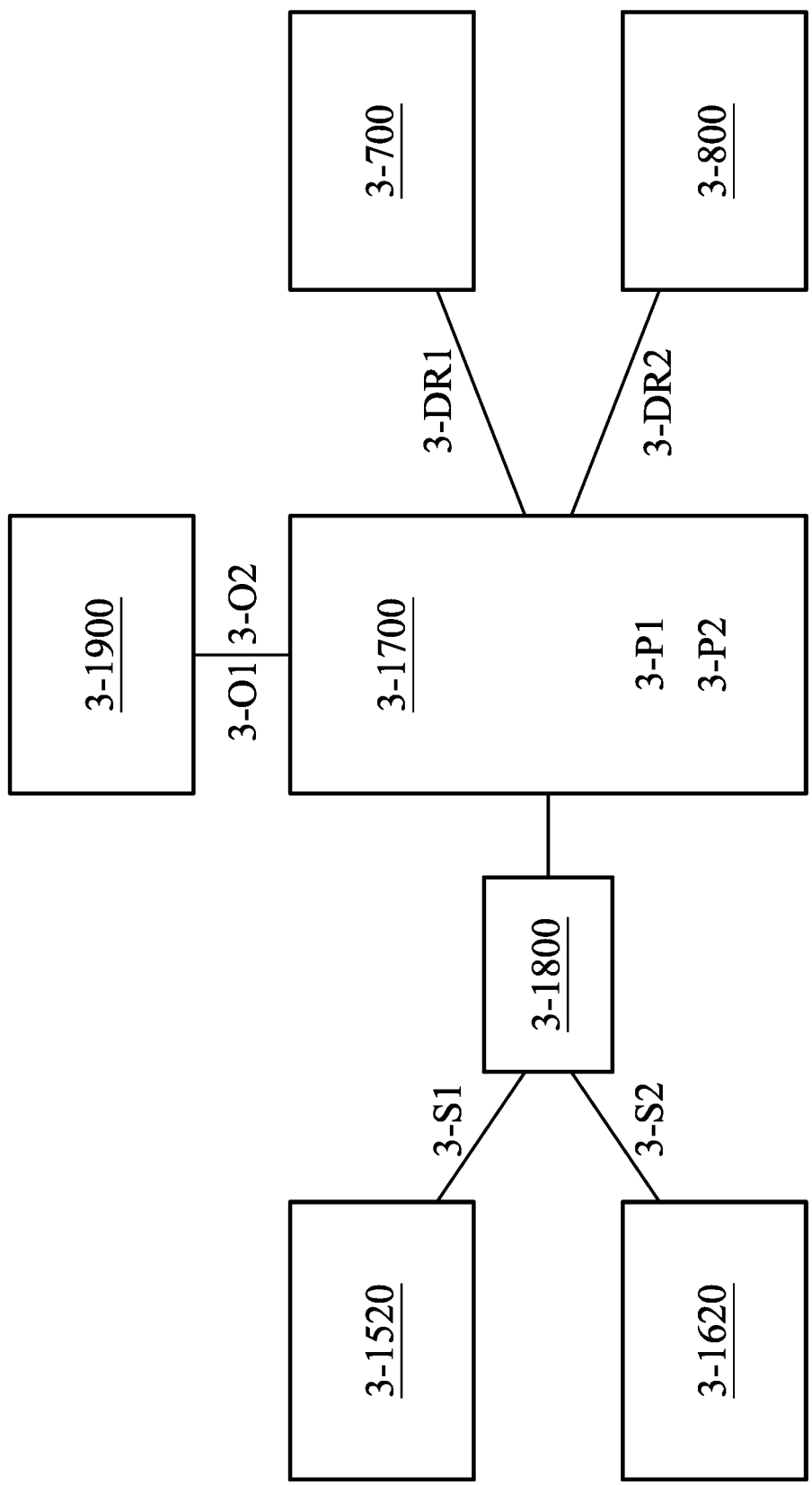
FIG. 24 is a schematic view of the connection of the control unit of the optical system, according to some embodiments of the present disclosure.

Referring to FIG. 24, FIG. 24 is a schematic view of the connection of the control unit 3-1700 of the optical system 3-10, according to some embodiments of the present disclosure. In some embodiments, the optical system 3-10 further includes a control unit 3-1700. The control unit 3-1700 has first predetermined information 3-P1 and second predetermined information 3-P2. The first predetermined information 3-P1 includes the status of a first magnetic field of the first reference magnetic element 3-1510 for each possible location of the first movable portion 3-300 relative to the fixed portion 3-900. The second predetermined information 3-P2 includes the status of a second magnetic field of the second reference magnetic element 3-1610 for each possible location of the second movable portion 3-400 relative to the first movable portion 3-300. The control unit 3-1700 is electrically connected to the first sensor 3-1520 and the second sensor 3-1620 via the circuit assembly 3-1800. The first sensor 3-1520 outputs a first sensing signal 3-S1 to the control unit 3-1700, and the second sensor 3-1620 outputs a second sensing signal 3-S2 to the control unit 3-1700. After the control unit 3-1700 receives the first sensing signal 3-S1 and the second sensing signal 3-S2, it may calculate the position of the first movable portion 3-300 relative to the fixed portion 3-900 based on the first sensing signal 3-S1 and the first predetermined information 3-P1, and calculate the position of the second movable portion 3-400 relative to the first movable portion 3-300 based on the second sensing signal 3-S2 and the second predetermined information 3-P2.

Based on the calculated position(s) of the first movable portion 3-300 and/or the second movable portion 3-400, an external controller 3-1900 may output a first instruction 3-O1 and/or a second instruction 3-O2 to the control unit 3-1700. The control unit 3-1700 may output a first driving signal 3-DR1 to the first driving assembly 3-700 based on the first instruction 3-O1, driving the first movable portion 3-300 to move. In some embodiments, the movement of the first movable portion 3-300 may change the focal length of the optical unit (e.g. including the first optical element 3-100, the second optical element 3-200, and the first movable portion 3-300), so that the optical system 3-10 performs the function of zooming. The control unit 3-1700 may output a second driving signal 3-DR2 to the second driving assembly 3-800 based on the second instruction 3-O2, driving the second movable portion 3-400 to move. In some embodiments, the movement of the second movable portion 3-400 may change the image plane of the optical unit, so that the optical system 3-10 performs the function of focusing.

In some embodiments, first, the control unit 3-1700 outputs the first driving signal 3-DR1 to the first driving assembly 3-700. After the first driving assembly 3-700 drives the first movable portion 3-300 to move, and after the first movable portion 3-300 arrives at its desired position, the control unit 3-1700 then outputs the second driving signal 3-DR2 to the second driving assembly 3-800, so that the second driving assembly 3-800 drives the second movable portion 3-400 to move to its desired position. In other words, the control unit 3-1700 may control the optical system 3-10 to perform zooming before focusing. This precise control of positions may achieve better optical effects.

Figure 25:
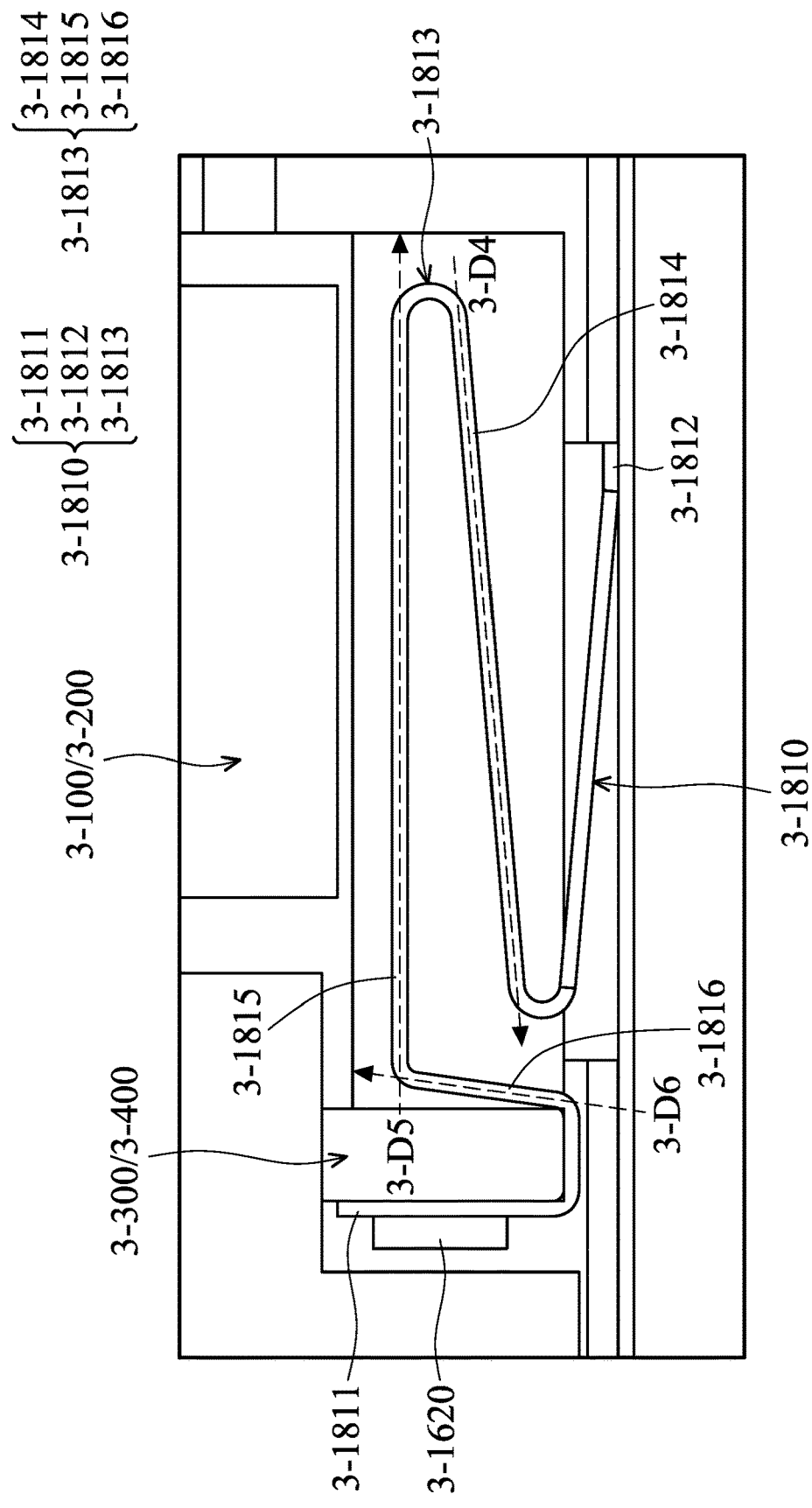
FIG. 25 is a partial zoomed-in top view of the circuit assembly of the optical system, according to some embodiments of the present disclosure.

FIG. 25 is a partial zoomed-in top view of the circuit assembly 3-1800 of the optical system 3-10, according to some embodiments of the present disclosure. Referring to FIG. 19 and FIG. 25, in some embodiments, the circuit assembly 3-1800 may include a first circuit element 3-1810 and a second circuit element 3-1820. The first circuit element 3-1810 connects the first movable portion 3-300 and the fixed portion 3-900. It should be noted that, in some embodiments, the first circuit element 3-1810 may also be used to connect the second movable portion 3-400 and the fixed portion 3-900, as shown in FIG. 25. The first movable portion 3-300 or the second movable portion 3-400 may be movably connected to the fixed portion 3-900 via the first circuit element 3-1810 of the circuit assembly 3-1800. When viewed in the second direction 3-D2, the first circuit element 3-1810 partially overlaps the first optical element 3-100 and the second optical element 3-200. The second circuit element 3-1820 is disposed on the lateral sides of the frame 3-910 of the fixed portion 3-900. The second circuit element 3-1820 may be electrically connected to the first driving assembly 3-700, the second driving assembly 3-800, and the first sensing assembly 3-1500, etc. The second circuit element 3-1820 may also be electrically connected to the second sensing assembly 3-1600 through the first circuit element 3-1810, for supplying electric powers.

As shown in FIG. 25, the circuit element 3-1810 may include a movable end 3-1811, a fixed end 3-1812, and a flexible portion 3-1813. The movable end 3-1811 is fixedly connected to the second movable portion 3-400 (or the first movable portion 3-300). The fixed end 3-1812 is fixedly connected to the fixed portion 3-900. The movable end 3-1811 is movably connected to the fixed end 3-1812 via the flexible portion 3-1813. In some embodiment, the second sensor 3-1620 of the second sensing assembly 3-1600 may be disposed at the movable end 3-1811, and may be electrically connected to the movable end 3-1811.

As shown in FIG. 19, the flexible portion 3-1813 has a plate structure. Referring to FIG. 25, the flexible portion 3-1813 includes a first section 3-1814, a second section 3-1815, and a third section 3-1816. The first section 3-1814 extends in a fourth direction 3-D4. The second section 3-1815 extends in a fifth direction 3-D5. The third section 3-1816 extends in a sixth direction 3-D6. In the embodiment shown in FIG. 25, the fifth direction 3-D5 may be substantially parallel to the first direction 3-D1. The fourth direction 3-D4 is not parallel to the fifth direction 3-D5. The fifth direction 3-D5 is not parallel to the sixth direction 3-D6. The sixth direction 3-D6 is not parallel to the fourth direction 3-D4.

Figure 26A:
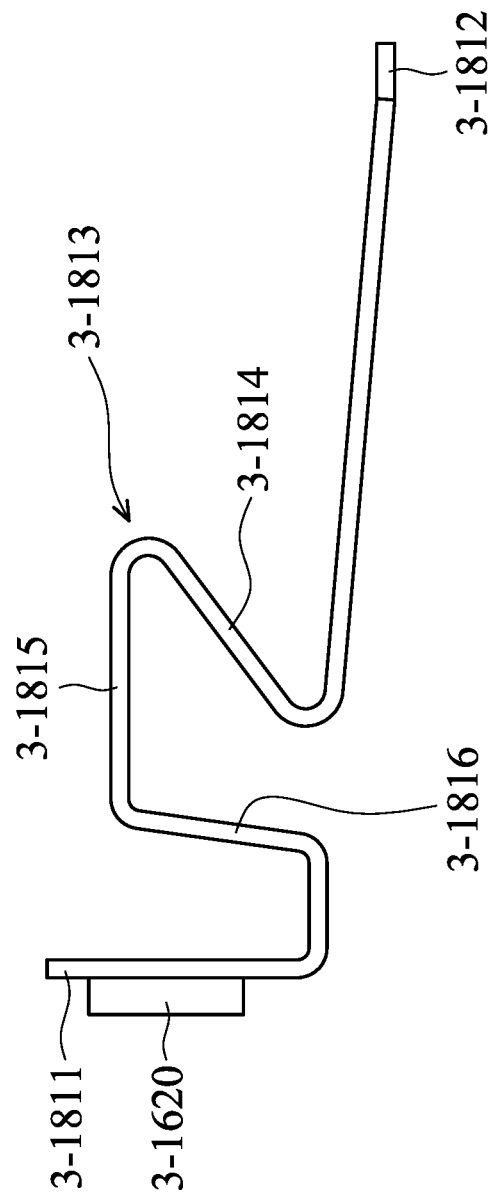
FIG. 26A shows a schematic view of the circuit assembly of the optical system in the first terminal position, according to some embodiments of the present disclosure.
Figure 26B:
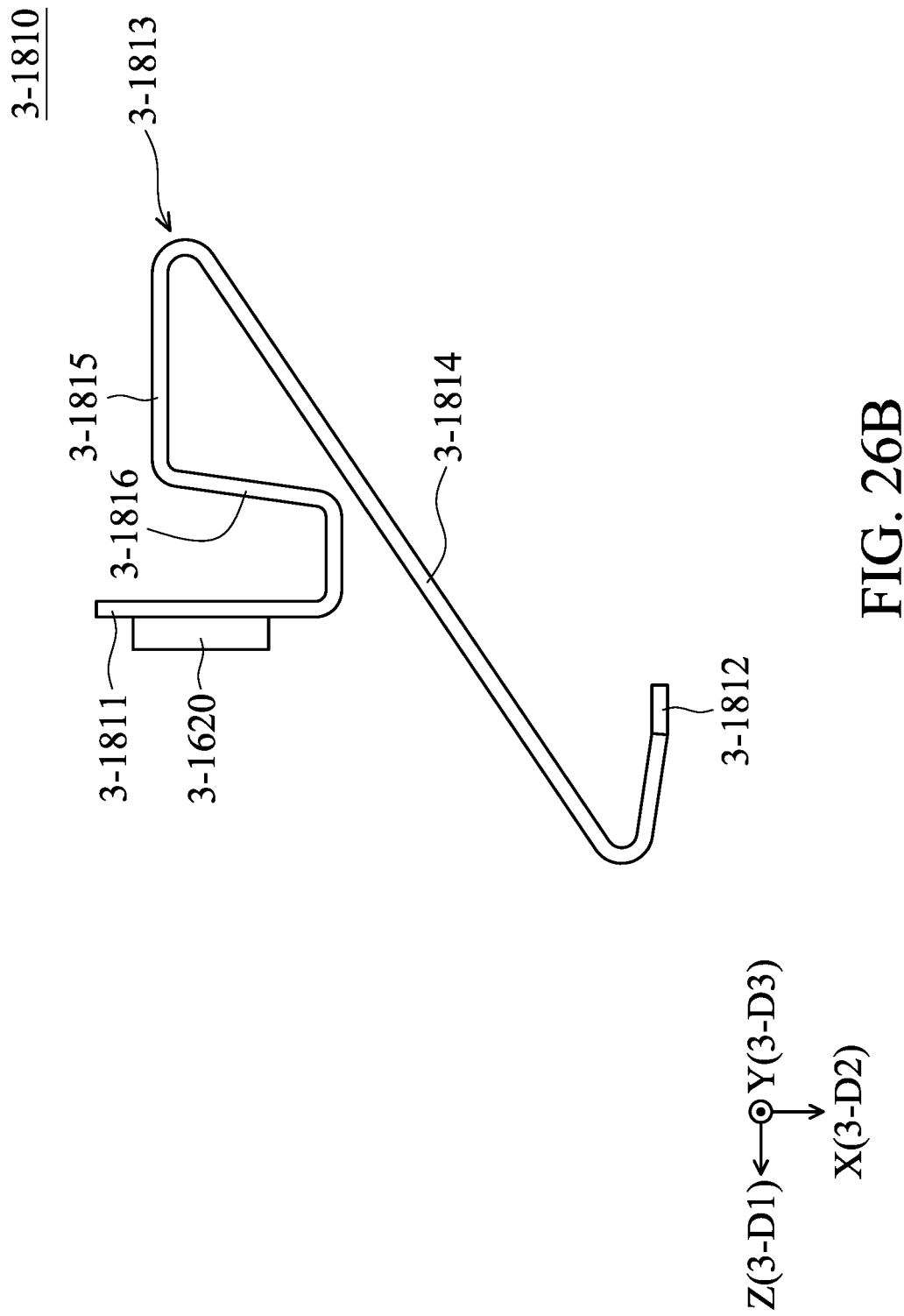
FIG. 26B shows a schematic view of the circuit assembly of the optical system in the second terminal position, according to some embodiments of the present disclosure.

Referring to FIGS. 25, 26A, and 26B, FIGS. 26A and 26B show schematic views of the first circuit element 3-1810 of the circuit assembly 3-1800 of the optical system 3-10 in the first terminal position and the second terminal position, respectively, according to some embodiments of the present disclosure. Since both the first movable portion 3-300 and the second movable portion 3-400 are movable relative to the fixed portion 3-900, the first circuit element 3-1810 may deform accordingly during the movements. When the first movable portion 3-300 is in an initial position (the position shown in FIG. 25) relative to the fixed portion 3-900, and viewed in the second direction 3-D2, the first section 3-1814 does not overlap the movable end 3-1811; the first section 3-1814 at least partially overlaps the fixed end 3-1812; the second section 3-1815 does not overlap the movable end 3-1811; and the second section 3-1815 at least partially overlaps the fixed end 3-1812. When the first movable portion 3-300 is in the first terminal position (the position shown in FIG. 26A) relative to the fixed portion 3-900, and viewed in the second direction 3-D2, the first section 3-1814 does not overlap the movable end 3-1811; the first section 3-1814 does not overlap the fixed end 3-1812; the second section 3-1815 does not overlap the movable end 3-1811; and the second section 3-1815 does not overlap the fixed end 3-1812. When the first movable portion 3-300 is in the second terminal position (the position shown in FIG. 26B) relative to the fixed portion 3-900, and viewed in the second direction 3-D2, the first section 3-1814 at least partially overlaps the movable end 3-1811; the first section 3-1814 at least partially overlaps the fixed end 3-1812; the second section 3-1815 does not overlap the movable end 3-1811; and the second section 3-1815 does not overlap the fixed end 3-1812.

It should be understood that the first movable portion 3-300 and the second movable portion 3-400 that are described in the present disclosure are interchangeable. That is, in some alternative embodiments, the elements that are connected to the first movable portion 3-300 herein may be connected to the alternative second movable portion 3-400, while the elements that are connected to the second movable portion 3-400 herein may be connected to the alternative first movable portion 3-300. As long as the relative motion between the first movable portion 3-300 and the second movable portion 3-400 are fulfilled, those embodiments are included in the scope of the present disclosure.

In summary, the optical system 3-10 of the present disclosure includes a plurality of optical elements (e.g. the first optical element 3-100 and the second optical element 3-200). A plurality of driving assemblies (e.g. the first driving assembly 3-700 and the second driving assembly 3-800) are used to drive the optical elements to move relative to the fixed portion 3-900 and/or relative to each other, achieving effects of optical zooming or optical focusing, or the like. A plurality of sensing assemblies (e.g. the first sensing assembly 3-1500 and the second sensing assembly 3-1600) are used to precisely control the positions of the optical elements. Additionally, a flexible circuit assembly (e.g. the first circuit element 3-1810) is provided to connect the movable portion that holds the optical element and the fixed portion, which is helpful for achieving further miniaturization of the mechanism.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system, comprising:
    a first movable portion connected to a first optical element;
    a fixed portion, wherein the first movable portion is movable relative to the fixed portion;
    a first driving assembly driving the first movable portion to move relative to the fixed portion;
    a first guiding structure guiding the first movable portion to move relative to the fixed portion in a first dimension;
    a second movable portion connected to a second optical element, wherein the second movable portion is movable relative to the fixed portion and the first movable portion;
    a second driving assembly driving the second movable portion to move relative to the fixed portion;
    wherein the first movable portion is movable within a first range of motion relative to the fixed portion;
    wherein the second movable portion is movable within a second range of motion relative to the fixed portion, wherein the second range of motion is different from the first range of motion;
    wherein the second movable portion is movable within a third range of motion relative to the first movable portion; and
    wherein the first guiding structure comprises:
    a first guiding element with a rod structure, extending in a first direction, fixedly disposed at the fixed portion, wherein the shortest distance between the first guiding element and the first movable portion is shorter than the shortest distance between the first guiding element and the second movable portion;
    a second guiding element, located at the first movable portion, having an opening structure corresponding to the first guiding element;
    a third guiding element, located at the second movable portion, having an opening structure corresponding to the first guiding element;
    a fourth guiding element with a rod structure, disposed in parallel with the first guiding element, fixedly disposed at the fixed portion, wherein the shortest distance between the fourth guiding element and the first movable portion is shorter than the shortest distance between the fourth guiding element and the second movable portion;
    a fifth guiding element, located at the first movable portion, having an opening structure corresponding to the fourth guiding element; and
    a sixth guiding element, located at the second movable portion, having an opening corresponding to the fourth guiding element.

2. The optical system as claimed in claim 1, wherein when viewed in a second direction that is perpendicular to the first direction, a second center of the opening structure of the second guiding element and a fifth center of the opening structure of the fifth guiding element form a first line, and the first line is neither parallel nor perpendicular to the first direction.

3. The optical system as claimed in claim 1, wherein when viewed in the second direction, a third center of the opening structure of the third guiding element and a sixth center of the opening structure of the sixth guiding element form a second line, and the second line is neither parallel nor perpendicular to the first direction.

4. The optical system as claimed in claim 1, further comprising:
    a second guiding structure guiding the second movable portion to move relative to the first movable portion in a second dimension;
    wherein a motion in the first dimension is a motion in the first direction, and a motion in the second dimension is a motion in a third direction, wherein the first direction is parallel to the third direction;
    wherein the second guiding structure comprises:
    a seventh guiding element with a rod structure, extending in the third direction, fixedly disposed at the first movable portion, wherein the largest size of the seventh guiding element in the third direction is smaller than the largest size of the first guiding element in the first direction;
    an eighth guiding element, located at the second movable portion, having an opening structure corresponding to the seventh guiding element;
    a ninth guiding element with a rod structure, disposed in parallel with the seventh guiding element, fixedly disposed at the first movable portion; and
    a tenth guiding element, located at the second movable portion, having an opening structure corresponding to the ninth guiding element.

5. The optical system as claimed in claim 4, wherein when viewed in the second direction, an eighth center of the opening structure of the eighth guiding element and a tenth center of the opening structure of the tenth guiding element form a third line, and the third line is neither parallel nor perpendicular to the first direction.

6. The optical system as claimed in claim 4, wherein when viewed in the second direction,
    the first guiding element at least partially overlaps the seventh guiding element;
    the fourth guiding element at least partially overlaps the ninth guiding element.

7. The optical system as claimed in claim 6, wherein when viewed in the second direction,
a first center of the first guiding element and a fourth center of the fourth guiding element form a fourth line, and the fourth line is perpendicular to the first direction and also perpendicular to the second direction;
a seventh center of the seventh guiding element and a ninth center of the ninth guiding element form a fifth line, and the fifth line is perpendicular to the second direction, and the fifth line is neither parallel nor perpendicular to the third direction.

8. The optical system as claimed in claim 4, wherein the first movable portion comprises a first connection strengthening portion and a first adhesive element, wherein the first adhesive element is disposed at the first connection strengthening portion;
wherein the first optical element comprises a first extension, protruding toward the first connection strengthening portion.

9. The optical system as claimed in claim 8, wherein when viewed in the second direction, the first connection strengthening portion at least partially overlaps the first extension of the first optical element;
when viewed in the third direction, the first optical element at least partially overlaps the seventh guiding element.

10. The optical system as claimed in claim 8, wherein the second movable portion comprises a second connection strengthening portion and a second adhesive element, wherein the second adhesive element is disposed at the second connection strengthening portion;
wherein the second optical element comprises a second extension, protruding toward the second connection strengthening portion.

11. The optical system as claimed in claim 10, wherein when viewed in the second direction, the second connection strengthening portion at least partially overlaps the second extension of the second optical element;
when viewed in the third direction, the second optical element at least partially overlaps the ninth guiding element.

12. The optical system as claimed in claim 10, wherein when viewed in the second direction, the center of the first connection strengthening portion and the center of the second connection strengthening portion form a sixth line, wherein the sixth line is neither parallel nor perpendicular to the first direction.

13. An optical system, comprising:
a first movable portion connected to a first optical element;
a fixed portion, wherein the first movable portion is movable relative to the fixed portion;
a first driving assembly driving the first movable portion to move relative to the fixed portion;
a first guiding structure guiding the first movable portion to move relative to the fixed portion in a first dimension;
a second movable portion connected to a second optical element, wherein the second movable portion is movable relative to the fixed portion and the first movable portion;
a second driving assembly driving the second movable portion to move relative to the fixed portion;
wherein the first movable portion is movable within a first range of motion relative to the fixed portion;
wherein the second movable portion is movable within a second range of motion relative to the fixed portion, wherein the second range of motion is different from the first range of motion;
wherein the second movable portion is movable within a third range of motion relative to the first movable portion;
wherein the optical system further comprises:
a first stopper assembly defining a movement of the first movable portion relative to the fixed portion, comprising:
a first stopper element fixedly disposed at the fixed portion; and
a second stopper element, corresponding to the first stopper element, fixedly disposed at the first movable portion;
wherein when the first movable portion is in a first terminal position relative to the fixed portion, the first stopper element is in direct contact with the second stopper element;
a second stopper assembly defining the movement of the first movable portion relative to the fixed portion, comprising:
a third stopper element fixedly disposed at the fixed portion; and
a fourth stopper element, corresponding to the third stopper element, fixedly disposed at the second movable portion;
wherein when the first movable portion is in a second terminal position relative to the fixed portion, the third stopper element is in direct contact with the fourth stopper element;
wherein the first terminal position is different from the second terminal position.

14. The optical system as claimed in claim 13, further comprising:
a third stopper assembly defining the movement of the second movable portion relative to the first movable portion, comprising:
a fifth stopper element fixedly disposed at the first movable portion; and
a sixth stopper element, corresponding to the fifth stopper element, fixedly disposed at the second movable portion;
wherein when the second movable portion is in a third terminal position relative to the first movable portion, the fifth stopper element is in direct contact with the sixth stopper element;
a fourth stopper assembly defining the movement of the second movable portion relative to the first movable portion, comprising:
a seventh stopper element fixedly disposed at the first movable portion; and
an eighth stopper element, corresponding to the seventh stopper element, fixedly disposed at the second movable portion;
wherein when the second movable portion is in a fourth terminal position relative to the first movable portion, the seventh stopper element is in direct contact with the eighth stopper element;
wherein the third terminal position is different from the fourth terminal position.

15. The optical system as claimed in claim 14, wherein when the fifth stopper element and the sixth stopper element are in contact, the first movable portion may carry the second movable portion in a first motion in the first dimension.

16. The optical system as claimed in claim 15, wherein when the seventh stopper element and the eighth stopper element are in contact, the first movable portion may carry the second movable portion in a second motion in the first dimension, wherein the first motion and the second motion are in opposite directions.

17. The optical system as claimed in claim 14, wherein:
the first stopper assembly further comprises a first damping element disposed at the first stopper element or at the second stopper element;
the second stopper assembly further comprises a second damping element disposed at the third stopper element or at the fourth stopper element;
the third stopper assembly further comprises a third damping element disposed at the fifth stopper element or at the sixth stopper element;
the fourth stopper assembly further comprises a fourth damping element disposed at the seventh stopper element or at the eighth stopper element.

* * * * *